(12) United States Patent
Kumar et al.

(10) Patent No.: US 10,395,169 B1
(45) Date of Patent: Aug. 27, 2019

(54) SELF LEARNING NEURAL KNOWLEDGE ARTIFACTORY FOR AUTONOMOUS DECISION MAKING

(71) Applicant: GLOBAL ELMEAST INC., Sunnyvale, CA (US)

(72) Inventors: Manoj Prasanna Kumar, Fremont, CA (US); Ken Zhang, Saratoga, CA (US)

(73) Assignee: GLOBAL ELMEAST INC., Sunnyvale, CA (US)

( * ) Notice: Subject to any disclaimer, the term of this patent is extended or adjusted under 35 U.S.C. 154(b) by 0 days.

(21) Appl. No.: 16/029,032

(22) Filed: Jul. 6, 2018

(51) Int. Cl.
| | |
|---|---|
| *G06F 15/18* | (2006.01) |
| *G06N 3/08* | (2006.01) |
| *G06N 3/04* | (2006.01) |
| *G06F 16/951* | (2019.01) |
| *G06F 16/2457* | (2019.01) |

(52) U.S. Cl.
CPC ......... *G06N 3/08* (2013.01); *G06F 16/24578* (2019.01); *G06F 16/951* (2019.01); *G06N 3/0427* (2013.01); *G06N 3/0445* (2013.01)

(58) Field of Classification Search
CPC .. G06F 17/2785; G06F 17/30967; G06N 3/02
USPC .................................................... 706/15, 45
See application file for complete search history.

(56) References Cited

U.S. PATENT DOCUMENTS

| | | | |
|---|---|---|---|
| 5,218,646 A | | 6/1993 | Sirat et al. |
| 6,233,575 B1 | | 5/2001 | Agrawal et al. |
| 9,846,836 B2 | * | 12/2017 | Gao .......................... G06N 3/04 |
| 2005/0100209 A1 | | 5/2005 | Lewis et al. |
| 2005/0223002 A1 | | 10/2005 | Agarwal et al. |
| 2008/0092182 A1 | | 4/2008 | Conant |
| 2008/0120322 A1 | | 5/2008 | Liu et al. |
| 2008/0270120 A1 | * | 10/2008 | Pestian ............... G06F 17/2785 704/9 |
| 2009/0106173 A1 | | 4/2009 | Andrew et al. |

(Continued)

OTHER PUBLICATIONS

U.S. Appl. No. 16/029,052, Non-Final Office Action dated Nov. 30, 2018.

(Continued)

*Primary Examiner* — David R Vincent
(74) *Attorney, Agent, or Firm* — Wong & Rees LLP; Zhichong Gu

(57) ABSTRACT

Approaches, techniques, and mechanisms are disclosed for generating, enhancing, applying and updating knowledge neurons for providing decision making information to a wide variety of client applications. Domain keywords for knowledge domains are generated from domain data of selected domain data sources, along with keyword values for the domain keywords, and are used to generate knowledge artifacts for inclusion in knowledge neurons. These knowledge neurons may be enhanced by domain knowledge data sets found in various data sources and used to generate neural responses to neural queries received from the client applications. Neural feedbacks may be used to update and/or generate knowledge neurons. Any ML algorithm can use, or operate in conjunction with, a neural knowledge artifactory comprising the knowledge neurons to enhance or improve baseline accuracy, for example during a cold start period, for augmented decision making and/or for labeling data points or establishing ground truth to perform supervised learning.

20 Claims, 16 Drawing Sheets

(56) References Cited

U.S. PATENT DOCUMENTS

| | | | | |
|---|---|---|---|---|
| 2010/0088262 A1* | 4/2010 | Visel | ................. | G06N 3/02 |
| | | | | 706/18 |
| 2010/0185437 A1* | 7/2010 | Visel | ................. | G06F 17/271 |
| | | | | 704/9 |
| 2012/0233127 A1* | 9/2012 | Solmer | ............. | G06F 17/30073 |
| | | | | 707/661 |
| 2013/0226913 A1 | 8/2013 | Rajput et al. | | |
| 2013/0246322 A1* | 9/2013 | De Sousa Webber | ................. | |
| | | | | G06N 3/0454 |
| | | | | 706/18 |
| 2013/0282633 A1* | 10/2013 | Seale | ................. | G06N 3/061 |
| | | | | 706/15 |
| 2016/0140236 A1* | 5/2016 | Estes | ................. | G06N 5/022 |
| | | | | 707/709 |
| 2016/0247061 A1* | 8/2016 | Trask | ................. | G06N 3/04 |
| 2018/0196881 A1* | 7/2018 | Lundin | ............. | G06F 17/30867 |
| 2018/0276535 A1* | 9/2018 | Mohamed | ............. | G06N 3/063 |

OTHER PUBLICATIONS

U.S. Appl. No. 16/029,087, Non-Final Office Action dated Sep. 7, 2018.

U.S. Appl. No. 16/029,087, Notice of Allowance dated Jan. 28, 2019.

U.S. Appl. No. 16/029,106, Non-Final Office Action dated Nov. 26, 2018.

\* cited by examiner

```
Neuron:
{
Id: NEU-HEA-005,
Method: "Web",
Domain: "healthcare",
Keywords: "Body Temperature",
      Knowledge:
      {
      Subject: "Gender: Male; Ethnicity: Asian; Age: (20-40)"
      Inference: "BodyTemp: 97F"
      }
Relates to:
[{
ID: "NEU-HEA-002",
Weight: 0.6
}]
}
```

FIG. 3A

1. $L_1 \leftarrow \{\text{large } 1-\text{itemsets}\}$
2. $k \leftarrow 2$
3. while $L_{k-1} \neq \emptyset$
4. $\quad C_k \leftarrow \{a \cup \{b\} \mid a \in L_{k-1} \wedge b \notin a\} - \{c \mid \{s \mid s \subseteq c \wedge |s| = k-1\} \not\subseteq L_{k-1}\}$
5. $\quad$ for transactions $t \in T$
6. $\quad\quad C_t \leftarrow \{c \mid c \in C_k \wedge c \subseteq t\}$
7. $\quad\quad$ for candidates $c \in C_t$
8. $\quad\quad\quad count[c] \leftarrow count[c] + 1$
9. $\quad L_k \leftarrow \{c \mid c \in C_k \wedge count[c] \geq \epsilon\}$
10. $\quad k \leftarrow k + 1$
11. return $\bigcup_k L_k$

FIG. 3B

```
Neuron:
{
Id: NEU-HEA-006,
Method: "AI",
Domain: "healthcare",
Keywords: "Body Temperature",
      Knowledge:
      {
      Subject: "Gender: Male; Ethnicity: Asian; Age: (20-40),
BMI: (26-30), HeartRate: (110-130)"
      Inference: "BodyTemp: (96F-97F)"
      }
Relates to:
[{
ID: "NEU-HEA-005",
Weight: 0.87
}]
}
```

FIG. 3C

```
Neuron:
{
Id: NEU-HEA-005,
Method: "Web",
Domain: "healthcare",
Keywords: "Body Temperature",
      Knowledge:
      {
      Subject: "Gender: Male; Ethnicity: Asian; Age: (20-40)"
      Inference: "BodyTemp: 97F"
      },
      History:
      {
            Event: "Air conditioner on"
            Condition: "Temperature 70F"
      }
Relates to:
[{
ID: "NEU-HEA-002",
Weight: 0.6
}]
}
```

FIG. 3G

```
Neuron:
{
Id: NEU-HEA-005,
Method: "Web",
Domain: "healthcare",
Keywords: "Body Temperature",
      Knowledge:
      {
      Subject: "Gender: Male; Ethnicity: Asian; Age: (20-40)"
      Inference: "PreferredTemp: 68.25F", "BodyTemp: 97F"
      },
      History:
      {
            Event: "Air conditioner on"
            Condition: "Temperature 70F"
      }
Relates to:
[{
ID: "NEU-HEA-002",
Weight: 0.6
}]
}
```

*FIG. 3H*

SELF LEARNING NEURAL KNOWLEDGE ARTIFACTORY FOR AUTONOMOUS DECISION MAKING

CROSS-REFERENCE TO RELATED APPLICATIONS

This application is related to U.S. patent application Ser. No. 16/029,052, titled "TECHNIQUES FOR KNOWLEDGE NEURON ENHANCEMENTS," by Manoj Prasanna Kumar, filed on Jul. 6, 2018; U.S. patent application Ser. No. 16/029,087, titled "TECHNIQUES FOR PROCESSING NEURAL QUERIES," by Manoj Prasanna Kumar, filed on Jul. 6, 2018; U.S. patent application Ser. No. 16/029,106, titled "METHODOLOGY TO AUTOMATICALLY INCORPORATE FEEDBACK TO ENABLE SELF LEARNING IN NEURAL LEARNING ARTIFACTORIES," by Manoj Prasanna Kumar, filed on Jul. 6, 2018, the contents of all of which are incorporated herein by reference in their entireties.

TECHNICAL FIELD

Embodiments relate generally to artificial intelligence, and, more specifically, to self-learning neural knowledge artifactory for autonomous decision making.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Machine learning may be implemented based on a set of training data to train potentially complex models and algorithms for making predictions and further based on a set of test data to measure accuracies and robustness in the predictions made with the complex models and algorithms as trained with the set of training data. The accuracies and robustness in the predictions in machine learning may be largely dependent on whether the set of training data and/or the set of test data is sufficiently large. Thus, for a few large-scale companies or entities such as Google, Facebook, or Uber that own big data, machine learning can be relatively effectively implemented and used for their specific applications.

For a wide variety of other companies, entities and/or individuals and for a wide variety of general or specific applications, however, sufficiently large sets of training and test data may be out of reach, especially at an initial deployment stage of systems when large numbers of feedbacks have yet to be collected by the systems implementing artificial intelligence (AI) or machine learning (ML). As a result, it may take a long time, a lot of resources, and a large amount of investment before such a system becomes accurate and robust under currently available approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A FIG. 3C, FIG. 3G and FIG. 3H illustrate example knowledge neurons; FIG. 3B illustrates an example knowledge extraction process flow.

DETAILED DESCRIPTION

Figure 1:
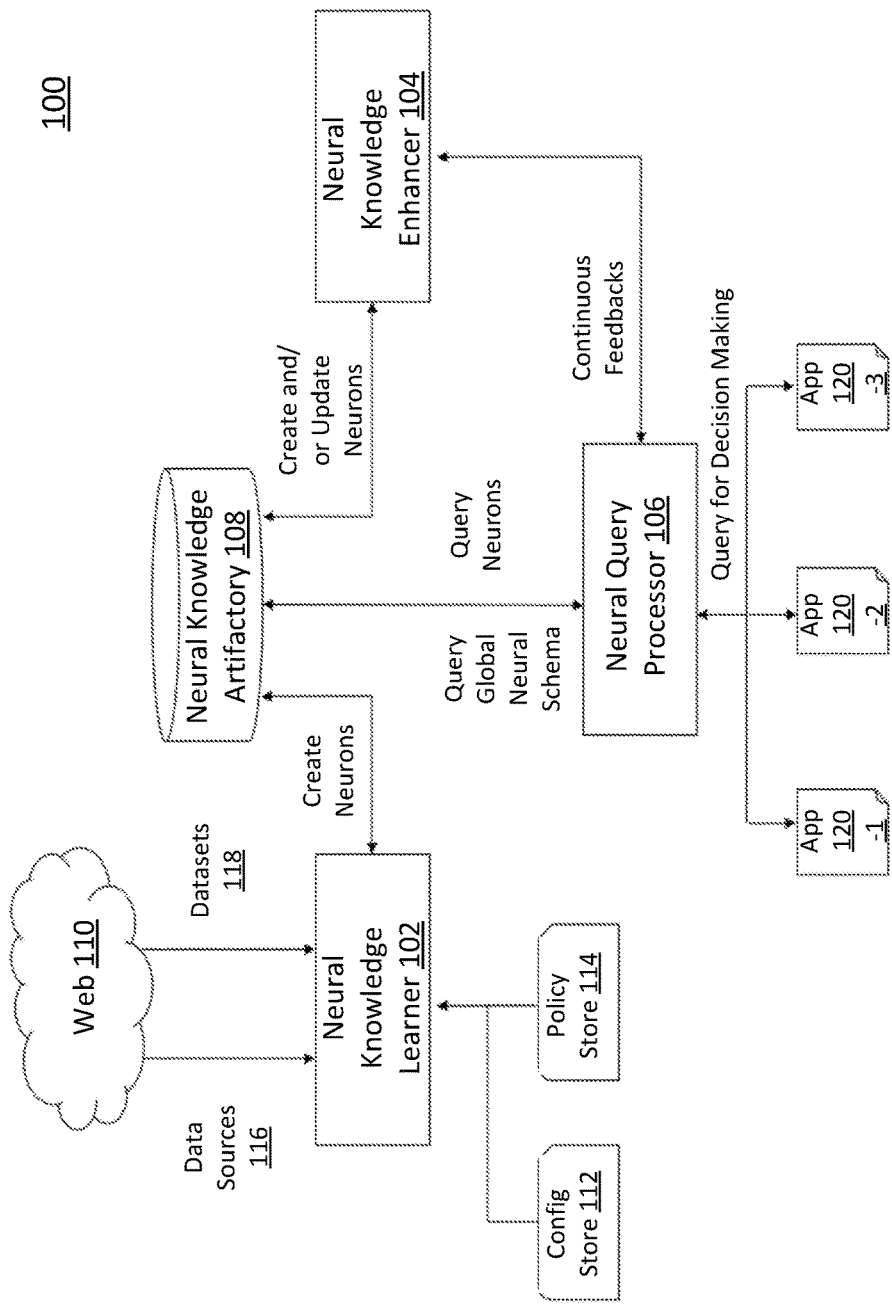
FIG. 1 illustrates an example system relating to self-learning neural knowledge artifactory for autonomous decision making.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
    2.0. Structural Overview
    2.1. Neural Knowledge Learner
    2.2. Data Source Selection Mechanism
    2.3. Multi-Stage Natural Language Processing
    2.4. Neural Knowledge Enhancer
    2.5. Neural Query Processing
    2.6. Continuous Neural Feedback Processing
    3.0. Example Embodiments
    4.0. Implementation Mechanism—Hardware Overview
    5.0. Extensions and Alternatives

1.0. General Overview

Artificial intelligence is typically heavily data driven. AI models/algorithms employed in an AI system for decision making in a wide variety of operations and tasks may be trained through machine learning, deep learning, neural-network-based learning, probabilistic learning, etc., based on relatively large training data sets and test data sets. However, when there is no or little data available, AI models/algorithms fail to make accurate predictions/decisions.

In contrast, techniques as described herein can be used to reduce or remove (e.g., initial, ongoing, etc.) heavy dependence on large data sets on the part of AI systems and applications. These techniques make the AI systems and applications less dependent on historic application data to learn trends and act as a catalyst or enabler to make accurate decisions even when there is no or little data available for the ML models in AI systems and applications to learn trends.

In many operational scenarios, historic data may be available in, or may be accumulated/collected/acquired for, specific applications and specific use cases. Such historic data may or may not be exhaustive, relevant, or sufficient, for applications and use cases other than the specific applications and the specific use cases.

Techniques as described herein can be used to enable AI models/algorithms operating with other applications and other use cases to make maximal/optimal/efficient use of the historic data available or accumulated/collected/acquired in the specific applications and the specific use cases. In the meantime, these techniques can be used to enable the AI models/algorithms to make relatively accurate decisions for the other applications and the other use cases which are not or little covered in the historic data and which are not learned by the AI models/algorithms.

Instead of heavily and/or overly depending on the availability of large training and test data sets, an AI system implementing techniques as described herein can perform self-learning to extract knowledge artifacts from a wide variety of contents/documents available from a wide variety of data sources (e.g., websites, etc.) in a wide variety of knowledge domains, encapsulate these knowledge artifacts in knowledge neurons maintained/stored/cached in a neural knowledge artifactory, automatically update existing knowledge neurons and create new knowledge neurons based on new discoveries of knowledge artifacts, thereby making decision making information in the neural knowledge artifactory to be constantly relevant and up to date, with or without large volume of training and/or test data being available.

Multiple feedback mechanisms can be implemented for self-learning performed by an AI system implementing techniques as described herein by way of knowledge neurons incorporating knowledge obtained by the self-learning (and/or operating with other AI/ML methods). The AI system can perform (e.g., automatically, periodically, from time to time, continuously, on demand, etc.) knowledge learning queries to data sources to determine whether any updates of knowledge artifacts are available from the data sources (e.g., in the web, websites, etc.) for inclusion in knowledge neurons; automatically find and learn new datasets in connection with keywords or knowledge artifacts relevant to the knowledge domains in which the system operate; continuously take feedback from applications (e.g., external applications, internal applications, remote applications, local applications, mobile applications, client applications, etc.) querying the neural knowledge artifactory in the system; ensure constant multi-level updates to the knowledge neurons maintained/stored/cached in the system; and so forth.

As used herein, a "knowledge domain" or "a vertical" may refer to a specific field of knowledge as related to a discipline, a profession, a business, an entity, an organization, a type of expertise (e.g., a medical specialty, an architectural field, an investment field/sector, etc.), a type of computer-implemented or computer-assisted system and/or application, etc. Example knowledge domains may include, but are not necessarily limited to only, any of: "Healthcare", "Traffic", "Weather", "Stock Market," and so forth. As used herein, a "knowledge neuron" may refer to a data structure or a data container that encapsulates one or more of knowledge artifacts such as keywords, subjects, inferences, real time or non-real-time measurements related to the knowledge artifacts, feedback history, decision making information items, preferred values, relationships to other knowledge neurons or other knowledge artifacts, etc. A "knowledge artifact" may refer to a knowledge item (e.g., a smallest unit of knowledge captured in a knowledge neuron, a unit of knowledge based on a key sentence discovered in a science journal, etc.) represented by at least (1) one or more keywords established in a knowledge domain extracted from content of a data source and (2) relevant information derived for the one or more keywords extracted from the content of the data source. Additionally, optionally or alternatively, a knowledge artifact or a knowledge neuron encapsulating the knowledge artifact may be enhanced by incorporating up-to-date information derived from the original and/or other data sources, information from related knowledge artifacts or related knowledge neurons, predicted/optimized values derived from neural feedbacks, real-time and/or non-real-time measurements and collected sensory data, predicted values from other AI or ML methods/algorithms, etc.

Knowledge neurons in the system can be validated/enhanced in multiple level validation/enhancements. The system can use natural language processing (NLP) as one mechanism to extract knowledge artifacts/objects from content of data sources (e.g., in the web, etc.). Additionally, optionally or alternatively, the system can cross correlate the extracted knowledge artifacts/objects with knowledge data from other data sources (e.g., in the web, etc.). Additionally, optionally or alternatively, the system can use AI models/algorithms, machine learning, deep learning, and so forth, to learn trends from relevant (e.g., public, proprietary, etc.) datasets to validate the knowledge neurons learnt from various data sources (e.g., in the web, etc.) and to update any missing knowledge artifacts in existing and/or new knowledge neurons in the system. Additionally, optionally or alternatively, any AI and/or ML algorithm can use, or operate in conjunction with, a neural knowledge artifactory comprising the knowledge neurons to enhance or improve baseline accuracy, for example during a cold start period or any subsequent time period, for augmented decision making and/or for labeling data points or establishing ground truth to perform supervised learning.

The neural knowledge artifactory in the system can be vertical agnostic (or knowledge-domain agnostic) and can be used to learn knowledge artifacts about any vertical (e.g., any knowledge domain, etc.). The system can also be used by applications irrespective of any specific knowledge domains to which the applications pertain.

Example approaches, techniques, and mechanisms are disclosed for neural knowledge learning, enhancement, applications and feedbacks.

According to one embodiment, one or more knowledge domains under which one or more sets of knowledge neurons are to be organized are identified. Each knowledge domain in the one or more knowledge domains corresponds to a respective set of knowledge neurons in the one or more sets of knowledge neurons. One or more sets of domain data sources from which domain data for generating one or more sets of knowledge artifacts for the one or more knowledge domains is to be retrieved are selected. Each set of domain data sources in the one or more sets of domain data sources corresponds to a respective knowledge domain in the one or more knowledge domains. Each set of knowledge artifacts in the one or more sets of knowledge artifacts corresponds to a respective knowledge domain in the one or more knowledge domains. One or more sets of domain keywords are generated, for the one or more knowledge domains, from the domain data retrieved from the one or more sets of domain data sources for generating the knowledge artifacts. Each set of domain keywords in the one or more sets of domain keywords corresponds to a respective knowledge domain in the one or more knowledge domains. One or more sets of keyword values for the one or more sets of domain keywords are determined. Each set of keyword values in the one or more sets of keyword values corresponds to a respective set of domain keywords in the one or more sets of domain keywords. The one or more sets of domain keywords and the one or more sets of keyword values respectively corresponding to the one or more sets of domain keywords are used to generate the one or more sets of knowledge artifacts to be included in the one or more sets of knowledge neurons.

According to an embodiment, a domain knowledge dataset comprising a plurality of domain knowledge data instances is looked up based on one or more domain keywords. Each domain knowledge data instance in the plurality of domain knowledge data instances comprises a plurality of property values for a plurality of properties. Each property value in the plurality of property values corresponds to a respective property in the plurality of properties. The plurality of domain knowledge data instances in the domain knowledge dataset is used to determine a plurality of combinations of frequently cooccurring properties. Each combination of frequently cooccurring properties in the plurality of combinations of frequently cooccurring properties represents a different combination of properties in a set of all combination of properties generating from the plurality of properties. A specific combination of frequently cooccurring properties (e.g., with the largest total number of properties, etc.) is selected, based on one or more artifact significance score thresholds, from among the plurality of combinations of frequently cooccurring properties. The selected specific combination of frequently cooccurring properties is stored as a knowledge artifact in a knowledge neuron.

According to an embodiment, a neural query request is received. One or more query keywords are generated from the neural query request. One or more knowledge neurons in a repository of knowledge neurons are looked up based at least in part on a global neural schema and the one or more query keywords generated from the neural query request. A neural query response to the neural query request is generated based at least in part on one or more knowledge artifacts found in the one or more knowledge neurons.

According to an embodiment, a neural feedback is received. One or more feedback keywords are generated from the neural feedback. One or more knowledge neurons are looked up, based at least in part on a global neural schema and the one or more feedback keywords generated from the neural feedback, in a repository of knowledge neurons. Neural feedback information, derived from the neural feedback, is incorporated into the one or more knowledge neurons.

In other aspects, the invention encompasses computer apparatuses and computer-readable media configured to carry out the foregoing techniques.

2.0. Structural Overview

FIG. 1 is an illustrative view of various aspects of an example system 100 in which the techniques described herein may be practiced, according to an embodiment. System 100 comprises one or more computing devices. The one or more computing devices comprise any combination of hardware and software configured to implement the various logical components described herein, including components such as neural knowledge learner 102, neural knowledge enhancer 104, neural query processor 106, neural knowledge artifactory 108 and so forth. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

2.1. Neural Knowledge Learner

System 100 comprises a neural knowledge learner 102 that systematically extracts information from (e.g., domain-specific, general, selected, discovered, crawled. etc.) data sources 116 over one or more networks, analyzes the extracted information for the purpose of generating knowledge artifacts in one or more knowledge domains. Some or all of the data sources may be from the World Wide Web or other data source locations.

The information from the data sources can be collected/extracted by neural knowledge learner 102 in any combination of a wide variety of different methods. For example, none, some, or all of the information from the data sources may be collected/extracted through one or more bots (or neural bots) implemented by neural knowledge learner 102, such as internet bots, web robots, etc., that runs automated (e.g., repetitive at a certain rate, etc.) operations (with no or little human intervention) over the one or more networks such as the Internet.

Example knowledge domains may include, but are not necessarily limited to only, any of: "Traffic", "Weather", "Stock Market," "Modern Art," etc. The knowledge domains for which the knowledge artifacts are to be generated by neural knowledge learner 102 may be preconfigured or dynamically configured. For example, configuration settings that specify some or all of the knowledge domains and/or some or all of the data sources corresponding to the knowledge domains may be provided to neural knowledge learner 102 through one or more of: configuration files, configuration data structures, and so forth. In some embodiments, some or all of these configuration settings may be maintained, stored and/or cached in a configuration store (denoted as "config store 112" in FIG. 1). Neural knowledge learner 102 may access some or all of these configuration settings when neural knowledge learner 102 initially starts up, when user input that specifies the configuration settings should be refreshed is received, from time to time at runtime, etc.

Figure 2A:
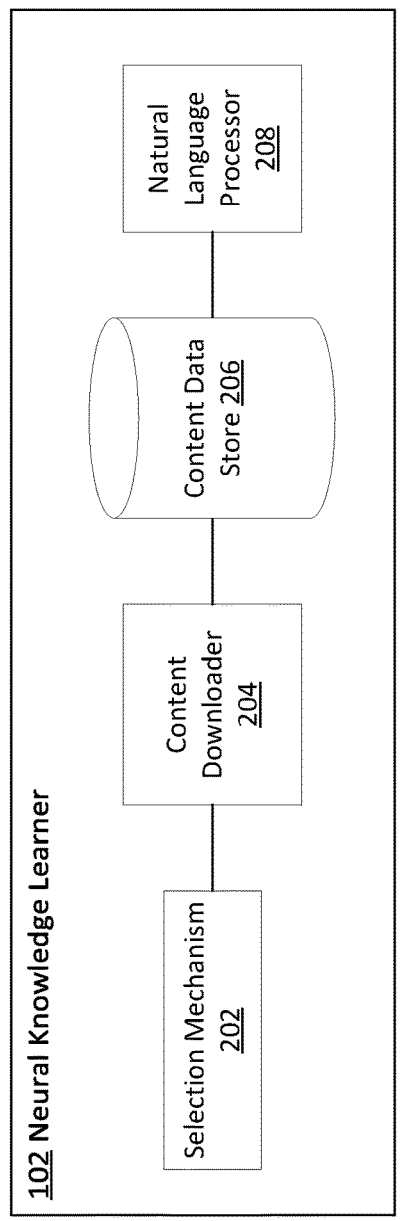
FIG. 2A illustrates an example neural knowledge learner.

Neural knowledge learner 102 may be implemented to use a selection mechanism (e.g., 202 of FIG. 2A, etc.) to find the best possible data sources (e.g., from the one or more networks, from the web 110, etc.) to extract the information relating to the knowledge domains. As illustrated in FIG. 2A, in some embodiments, the selection mechanism may be a part of neural knowledge learner 102.

The information extracted from the (e.g., best possible, etc.) data sources can be used to generate the knowledge artifacts. Knowledge neurons may be created or updated with some or all of the knowledge artifacts generated from the extracted information. The knowledge neurons comprising some or all of the knowledge artifacts may be represented in specific data structures; and may be stored/maintained/cached in a data repository such as a neural knowledge artifactory 108.

2.2. Data Source Selection Mechanism

Neural knowledge learner 102 may be configured to use one or more (e.g., different, etc.) search engines to retrieve or get documents (or webpages) with relevant information about the knowledge domains from the web 110.

A (document-level) knowledge relevance score (denoted as KRS) for a document (or webpage) as described herein may be computed (e.g., by selection mechanism 202 of FIG. 2A, etc.) as a function of one or more input variables such as a page rank for the document, a total number of citations citing the document or content therein, a total number of visits to the document, a popularity of a data source (or a website represented with a corresponding network or internet domain) from which the document is retrieved/accessed, etc. Documents can be stored or accessed in the descending order of their respective knowledge relevance scores (KRS) in a queue, a data structure, a data table, a data file, etc.

A page rank of a document (or a webpage) may be measured by counting the number and (e.g., automatically estimated, assigned, etc.) quality of links to the document to determine a rough estimate of how important the document or a website hosting the document is, assuming that a document or a website that is more important is likely to receive more links from other websites.

A total number of visits to the document may be measured by a count of how many visits are made to the document when it becomes available for access, from a starting point of a measurement time period, etc.

A total number of citations citing the document or content therein can be measured by other documents (or webpages) that cites the document or the content therein.

A popularity of a data source (or a website) from which the document is retrieved/accessed may be measured as a function of one or more popularity factors such as a recency factor measuring how recent content of the data source, not necessarily limited to the document as previously mentioned, was last updated, a frequency factor measuring how often the content of the data source is accessed, a total number of visits to the data source up to date or over a specific measurement time interval up to a certain time point such as now, and so forth.

Depth-first extraction may be performed for a data source (or a website) as described herein. A number of (e.g., 'x', 1, 2, 5, 10, etc.) parallel knowledge learner threads can be started up or spawned off with neural knowledge learner 102 to concurrently, simultaneously and/or contemporaneously extracting information from a single data source (a single website) or multiple data sources (or multiple websites). A total number of parallel knowledge learner threads may be statically or dynamically configured at least in part depending on capacities/capabilities of one or more computing devices that are used to run neural knowledge learner 102.

Knowledge relevance scores may be respectively assigned to different documents of a data source (or webpages of a website) in multiple passes, in an iterative/recursive process, and so forth. By way of illustration but not limitation, documents (or webpages) may be processed in a depth-first manner from data source 1 (or website 1) through data source n (or website n), where n is a positive integer, for a knowledge domain as described herein.

For example, knowledge relevance scores can be respectively assigned to different documents of data source 1 (e.g., different webpages of website 1, etc.) without using standard deviation and mean values as the standard deviation and mean values are yet to be computed.

However, once the knowledge relevance scores of the documents of data source 1 (e.g., the webpages of website 1, etc.) are computed/determined, standard deviation and mean values of a distribution of the knowledge relevance scores assigned to the documents of data source 1 (e.g., the webpages of website 1, etc.) may be computed/determined.

Subsequently, knowledge relevance scores can be respectively assigned to different documents of data source 2 (e.g., webpages of website 2, etc.) using the standard deviation and mean values that have been computed with the documents of all preceding data source(s), or data source 1 (e.g., the webpages of website 1, etc.) in the present example.

Once the knowledge relevance scores of the documents of data source 2 (e.g., the webpages of website 2, etc.) are computed/determined, standard deviation and mean values of a distribution of the knowledge relevance scores assigned to the documents of data sources 1 and 2 (e.g., the webpages of websites 1 and 2, etc.) may be computed/determined (e.g., using an iterative method, using an update method, using a progressive method, etc.). The standard deviation and mean values for data sources 1 and 2 may be used to determine knowledge relevance scores of documents of data source 3 (or website 3).

The iterative/recursive process as described above in connection with data sources 1, 2 and 3 may continue for any number of data sources (or websites) as specified by the configuration settings.

For example, for data source i (or website i), where i is any integer between one (1) and n, knowledge relevance scores can be assigned to documents of data source i (or webpages of website i), using the standard deviation and mean values computed with preceding data sources 1 through (i-1) (or websites 1 through (i-1)), as follows:

$$KRS = \frac{[(X*PageRank)+(Y*FrequencyOfVisits)+(Z*popularity)] - Avg(KRS_{0...i})}{std(KRS_{0...i})} \quad (1)$$

where X, Y and Z represent weights that may be empirically determined or statically or dynamically specified by system 100. The weights used to compute knowledge relevance scores can continuously change (or can be continuously updated) depending on the quantity of data sources or websites from which domain information as described herein is to be extracted.

For the purpose of illustration only, it has been shown in expression (1) above that a knowledge relevance score as described herein may be computed at least in part with input variables such as a page rank, a frequency of visits, a popularity of a data source, etc. It should be noted that, in various embodiments, other input variables such as a total number of citations citing a document or content therein, etc., may be used for computing knowledge relevance scores as described herein in place of, or in addition to, those input variables shown in expression (1) above. Similarly, for the purpose of illustration only, it has been shown in expression (1) above that a knowledge relevance score as described herein may be computed at least in part with statistical measures such as average, standard deviation, etc. It should be noted that, in various embodiments, other statistical measures such as modes, medium, maximum, minimum, variance, etc., may be used for computing knowledge relevance scores as described herein in place of, or in addition to, those statistical measures shown in expression (1) above.

Additionally, optionally or alternatively, in some embodiments, a (data-source-level or a data-source-group-level) knowledge relevance score may be computed (e.g., by selection mechanism 202 of FIG. 2A, etc.) for a single data source, or a group of data sources.

One or more combinations in various possible combinations of document-level knowledge relevance scores computed for documents of data sources and data-source-level and/or data-source-group-level knowledge relevance scores computed for the data sources or data source groups may be used (e.g., by selection mechanism 202 of FIG. 2A, etc.) to select a subset of data sources, from a population of data sources (evaluated for neural knowledge extraction), for neural knowledge extraction. In some embodiments, the subset of data sources may be those data sources, among the population of data sources, with the highest data-source-level or the highest data-source-group-level knowledge relevance scores.

Likewise, one or more combinations in various possible combinations of document-level knowledge relevance scores computed for documents of data sources and data-source-level and/or data-source-group-level knowledge relevance scores computed for the data sources or data source groups may be used (e.g., by selection mechanism 202 of FIG. 2A, etc.) to select a subset of documents, among a population of documents (hosted by the data sources or data source groups), from the data sources or data source groups for neural knowledge extraction. In some embodiments, each document in the subset of documents may represent a document, among the population of documents, with one of the highest document-level knowledge relevance scores among documents hosted by a selected data source with one of the highest data-source level knowledge relevance scores or a selected data source group with one of the highest data-source-group-level knowledge relevance scores.

2.3. Multi-Stage Natural Language Processing

In response to determining that information related to a knowledge domain is to be extracted from (e.g., selected, highest ranked, etc.) documents of a selected data source, neural knowledge learner 102, or a content downloader (e.g., 204 of FIG. 2A, etc.) therein, downloads contents of the documents of the selected data source are downloaded to a content data store (e.g., 206 of FIG. 2A, etc.) such as an in-memory data store, a cache, etc.

Subsequently, neural knowledge learner 102 analyzes, and extracts knowledge artifacts from, the contents of the documents of the selected data source. In some embodiments, a natural language processor (e.g., 208 of FIG. 2A, etc.) in neural knowledge learner 102 applies natural language processing (NLP) techniques to extract the knowledge artifacts from the contents of the documents of the data source.

By way of example but not limitation, neural knowledge learner 102 determines that information related to a knowledge domain such as "healthcare" is to be extracted from documents of a data source. Contents of the documents of the data source may comprise one or more natural language sentences written by authors of the documents. The natural language sentences may be provided to natural language processor 208 in neural knowledge learner 102 as input texts.

For example, the input texts provided to natural language processor 208 may include an input text with a natural language sentence "The normal body temperature of Asian males between 20 and 40 years of age is 97 F." Natural Language processing may be applied by natural language processor 208 in neural knowledge learner 102 to extract keywords from the sentence.

Figure 2B:
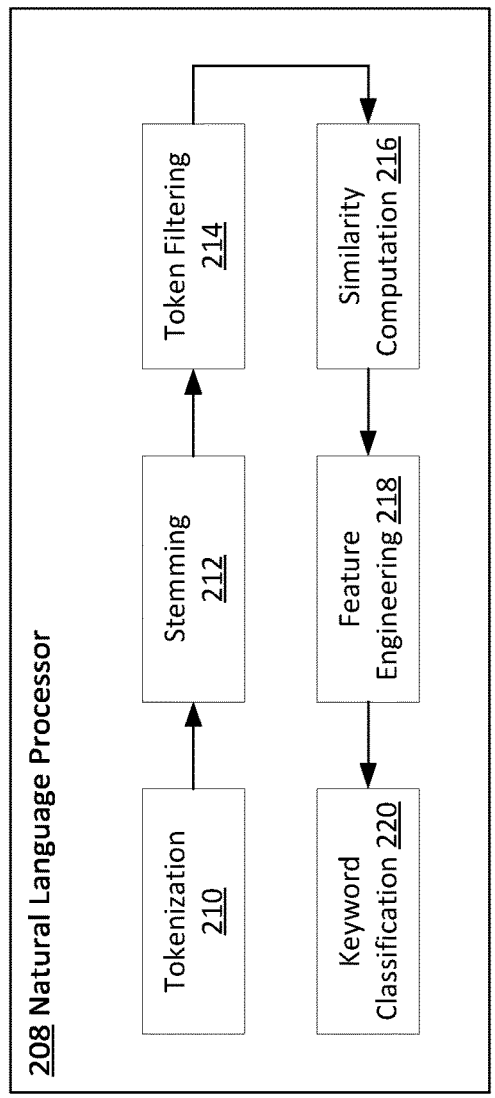
FIG. 2B illustrates an example self-learning process flow implemented at least in part with a natural language processor.

FIG. 2B illustrates an example process flow implemented by natural language processor 208. In block 210, the sentence may be fed as a part of the input text into a tokenizer (e.g., implemented as a part of natural language processor 208, etc.), which performs tokenization operations on the input text. The tokenization operations split the input text into (e.g., minimum-sized, sentences, words, phrases, typographic tokens, locutions, amalgams, punctuations, etc.) meaningful units, remove special characters and punctuations from the input text and divide/split the input text into chunks called tokens.

In some operational scenarios where a punctuation (e.g., a single end quotation mark "'", etc.) occurs within a word (e.g., "isn't", etc.) in the input text, the frequency of the word appearing with the punctuation in other parts of the input text (which may include zero or more other sentences in addition to the sentence recited above) and in historic tokens seen by system 100 may be computed/estimated. The frequency of the word may then be used to determine whether the word should be considered as one token.

Once the tokens are generated by the tokenizer, in block 212, stemming operations may be performed by natural language processor 208, or a stemmer implemented therein, on the tokens to reduce noise in the tokens and to obtain base words from all the tokens. Stemming (and lemmatization) may be used to reduce inflectional forms and derivationally related forms of a word to a common base form.

For example, from tokens such as "learned", "learning", "learns", etc., a base word "learn" may be obtained from these tokens through the stemming operations. Thus, through the stemming operations performed on the tokens, a set of base words that carry the intent of the input text can be identified from (e.g., the tokens of, etc.) the input text, and may be used as tokens (e.g., replacing the tokens before the stemming operations, etc.) in subsequent processing.

In block 214, token filtering operations may be performed natural language processor 208, or a token filter implemented therein, to normalize the tokens to a common representation. By way of illustration but not limitation, all the tokens are converted to lower case; common stop words like "an", "was", "is", etc., are removed from the tokens. The token filtering operations can be used to obtain filtered tokens that are more relevant to the knowledge domain than the tokens before the token filtering operations.

The filtered tokens constitute a current token set (of the knowledge domain) that is under consideration for inclusion into an existing token set (of the same knowledge domain) maintained/stored/cached in system 100. The existing token set of the knowledge domain comprises existing (e.g., up-to-date, etc.) tokens already selected for the knowledge domain. In comparison, the current token set comprises candidate tokens (or the filtered tokens) that are to be considered/selected for inclusion into the existing token set of the knowledge domain.

In block 216, after the token filtering operations are performed, a similarity score of the current token set (of the knowledge domain) in relation to the existing token set (of the same knowledge domain) is calculated. An example formula for calculating the similarity score (denoted as Similarity$_{K,D}$) is given as follows:

$$\text{Similarity}_{K,D} = (K_i \cap D)/(K_i \cup D) \quad (2)$$

where K denotes the current token set under consideration and D denotes the existing token set (e.g., comprising existing keywords determined for the knowledge domain, etc.) for the same domain in system 100. The operators "∩" and "∪" denote set intersection and set union operations, respectively. The similarity score has a range of values between zero (0) and one (1).

In some embodiments, in response to determining that the similarity score of the current token set under consideration is greater than a minimum similarity score threshold (e.g., 0.6, 0.65, 0.7, etc.), natural language processor 208 passes the current token set for further analysis to determine whether the current token set should be included in the existing token set. Otherwise, in response to determining that the similarity score of the current token set under consideration is no greater than the minimum similarity score threshold, natural language processor 208 determines that the current token set is not to be included in the existing token set.

The existing token set may be initialized in any combination of one or more different ways. In an example, the existing token set for the knowledge domain may be populated or seeded initially with one or more tokens provided or specified in system configuration date of system 100. In another example, the existing token set for the knowledge domain may be set to an empty set initially. When system 100, or natural language processor 208 therein, initially starts (e.g., in a cold start, in a system initialization, in a set initialization period, etc.) to analyze contents of documents of data sources for the knowledge domain, tokens obtained (e.g., after the token filtering operations, etc.) from a set of initial documents (e.g., the highest ranked document of the highest ranked data source, three highest ranked documents of the highest ranked data source, three highest ranked documents of the two highest ranked data sources, etc.) may be included in the existing token set of the knowledge domain, for example automatically without calculating similarity scores and/or without using similarity criteria (or selection criteria based entirely or in part on similarity scores) for selection/inclusion into the existing token set. In operational scenarios in which there are no or few pre-existing keywords or tokens established/determined for a knowledge domain (e.g., a new knowledge domain introduced into system 100, etc.) that system 100 is processing, there are several options to populate or seed keywords or tokens for the knowledge domain. In some embodiments, one or more (e.g., human, robotic, etc.) experts can provide user input specifying one or more keywords to be included in an existing token set—which may be empty or may contain very few established keywords/tokens, before the one or more keywords are incorporated—for that particular knowledge domain. Based on the user input from the experts, these keywords can be loaded to system 100 as the existing token set for the knowledge domain. Additionally, optionally or alternatively, some or all of the keywords identified by system 100 for a knowledge domain can be presented/displayed through a user interface to one or more experts for validation/enhancement, during the "cold start" period and/or in a subsequent time period. In some embodiments, once there is a relatively small number of keywords approved/established keywords/tokens for the knowledge domain, system 100 then starts self-learning for the knowledge domain by itself and continuously evolves the existing token set (or the keyword set) with new additions and/or new updates. Thus, in various embodiments, these and other ways of initializing the existing token set may be used to seed or populate tokens into the exiting token set initially.

After the initialization of system 100 in which the existing token set is initially populated or seeded with a non-empty set of filtered tokens and/or configured tokens, similarity scores (e.g., as calculated with expression (2) above, etc.) may be used to determine whether any candidate tokens are to be included in the existing token set for the knowledge domain. As a result, the existing token set includes not only past tokens but also present tokens that passes the similarity criteria on an on-going basis.

In block 218, after the current token set passes the similarity criteria, natural language processor 208 performs feature engineering operations on the filtered tokens in the current token set. These feature engineering operations can be used to extract or generate token features about each filtered token in the current token set. The token features may be represented as a feature vector and may include some or all of example token features as illustrated in TABLE 1 below.

TABLE 1

| Category | Feature |
| --- | --- |
| Frequency | Term Frequency, TF-IDF score Web Frequency |
| Structure | Term length |
| Type | Name entity, Noun phrase, n-gram (e.g., unigram, bigram, trigram, four-gram, five-gram, etc.) |
| Relationship to the input text | First occurrence in the input text (e.g., row no.), Distance between occurrences in the input text |

Example features (of a filtered token) such as listed on the right column of TABLE 1 above may be grouped or classified into a number of example categories such as listed on the left column of TABLE 1.

The "Frequency" category includes features such as "Term Frequency," "TF-IDF score," "Web Frequency," etc. The feature "Term Frequency" refers to the total number of times for which the token occurs in a single document (e.g., a single webpage, a single PDF file, a single WORD file, etc.) or in a single data source (e.g., a single website, etc.). The feature "Web frequency" refers to the total number of times for which the token occurs overall across all the (e.g., selected, etc.) data sources (or websites). The term "TF-IDF" refers to term frequency —inverse document frequency representing a numerical statistic that reflects how important the token is to a single document of a single data source in relation to all documents across all the (e.g., selected, etc.) data sources. The numeric statistic increases proportionally to the total number of times the token appears in the single document offset by the frequency of the token in all the documents across the data sources.

The "Structure" category includes features such as "Term Length," etc. The feature "Term Length" refers to the total number of words in the term representing the filtered token.

The "Type" category includes features such as "Named entity," "Noun phrase," "n-gram", etc. The feature "Named entity" indicates a specific named entity type for the filtered token if the token is determined to be a named entity. For example, a specific named entity type for a token "Male" is "Gender" in response to determining that the token is a named entity; a named entity type for a token "Asian" is "Ethnicity" in response to determining that the token is a named entity; a named entity type for a multi-word token "between 20 and 40 years of age" is "Age" in response to determining that the token is a named entity. Similarly, a named entity type for a multi-word token "Apple Computers" may be "Company" in response to determining that the token is a named entity. The feature "Noun phrase" indicates whether the token is a noun phrase (e.g., as opposed to a non-noun phrase such as a verb phrase, etc.). The feature "n-gram" indicates a n-gram type for a token, where n denotes the number of items in the token. Example items in the token may include, but are not necessarily limited to only, any of: phonemes, syllables, letters, words, etc.

The "Relationship to the input text" category includes features such as "First occurrence in text (row no)," "Distance between occurrences in text," etc. The feature "First occurrence in text (row no)" indicates a location or position (e.g., a row number in the input text comprising a plurality of rows, etc.) in the input text for the first occurrence of the token. The feature "Distance between occurrences in text" indicates a distance (e.g., an average distance, etc.) between consecutive occurrences of the token in the input text.

In some embodiments, each feature in some or all of the features (e.g., as illustrated in TABLE 1 above) may be normalized to a range of values between zero (0) and one (1) and sent/provided to a keyword classifier implemented by (or operating in conjunction with) natural language processor 208.

In block 220, natural language processor 208, or the keyword classifier operating therewith, performs keyword classification operations on the feature vector of each filtered token in the current token set and to assign, based at least in part on the features (e.g., some or all of which measure or indicate the importance of each such filtered token, etc.) represented in the feature vector, a probability (denoted as "p") of the filtered token being a keyword for the knowledge domain. In some embodiments, natural language processor 208 builds or implements a classification model (e.g., a random forest classification model, etc.) with the keyword classifier. The classification model may be used by the keyword classifier to predict the probability ("p") of the filtered token being a keyword for the knowledge domain. For example, based on some or all of frequency category features in TABLE 1 above, a filtered token that appears more frequently in the input text (e.g., of a single document, of a single webpage, of a single PDF file, of a single WORD file, etc.) but much less frequently on average in all documents of all the data sources may be considered/determined by the keyword classification operations as more likely to be a keyword. Similarly, based on some or all of these features in TABLE 1 above, a filtered token that is a noun phrase may be considered/determined by the keyword classification operations as more likely to be a keyword.

In response to determining that a probability (or probability score) of a filtered token in the current token set is greater than a minimum probability threshold (e.g., 0.7, 0.75, 0.8, etc.), natural language processor 208 selects the filtered token as a keyword for the knowledge domain.

Multi-stage natural language processing as described herein can be used to ensure that a final (e.g., up-to-date, etc.) set of keywords selected for a knowledge domain comprises keywords highly relevant to the knowledge domain.

Additionally, optionally or alternatively, the multi-stage natural language processing herein may include a second pass in which NLP operations are performed on the input text with regards to each keyword in some or all of keywords selected from the filtered tokens in the current token set for the purpose of obtaining support information (or attendant keyword information) about each such keyword.

For example, if "temperature" is selected as a keyword, (e.g., textual, etc.) value(s) like "97 F" that appear next to the keyword "temperature" in the input text can be obtained/extracted through the NLP operations performed in the second pass. Keywords selected from the current token set and all supporting information obtained/extracted from the input texts for the keywords represent knowledge artifacts extracted from the input text.

Knowledge neurons may be created or updated with some or all of the knowledge artifacts to capture the keywords and the support information for the keywords as obtained/extracted from the input text.

FIG. 3A illustrates an example data structure (denoted as "neuron") in which a knowledge neuron as described herein may be represented. The data structure "neuron" comprises a number of primary fields. The primary fields may include an "Id" field that stores or specifies a field value representing a unique identifier (e.g., "NEU-HEA-005", etc.) that may be used to uniquely identify the knowledge neuron among a plurality of knowledge neurons in system 100 or a knowledge domain therein. The primary fields may include a "Method" field that stores or specifies a field value representing a method (e.g., "Web", etc.) that is used to acquire or generate the knowledge neuron or knowledge artifact(s) captured therein. The primary fields may include a "Domain" field that stores or specifies a field value representing a knowledge domain (e.g., "healthcare", etc.) for which the knowledge neuron or the knowledge artifact(s) captured therein are generated. The primary fields may include a "Keywords" field that stores or specifies a field value representing one or more keywords (e.g., "Body Temperature", etc.), in the knowledge domain, to be included in the knowledge neuron. The primary fields may include a "Relates to" field that stores or specifies a field value representing one or more knowledge neurons to which the knowledge neuron is related.

Additionally, optionally or alternatively, the data structure "neuron" may comprise a number of secondary fields, tertiary fields, etc.

By way of example but not limitation, the field value in the primary field "Keywords" identifies a keyword "Body Temperature." A secondary field "Knowledge" may be used under the primary field "Keywords" in the data structure "neuron" to store or specify a secondary field value representing one or more knowledge artifacts for the keyword "Body Temperature" identified by the field value of the primary field "Keywords". One of the knowledge artifacts for the keyword "Body Temperature" may be, but is not necessarily limited to only, a knowledge artifact representing or comprising support information (or attendant keyword information) extracted, for the keyword "Body Temperature," from the sentence ("The normal body temperature of Asian males between 20 and 40 years of age is 97 F.") of the previously discussed input text. As illustrated in FIG. 3A, the second field "Knowledge" comprises a number of tertiary fields. In particular, a first tertiary field "Subject" in the secondary field "Knowledge" may store or specify a tertiary field value "Gender: Male; Ethnicity: Asian; Age: (20-40)" representing a subject to which the knowledge artifact relates. A second tertiary field "Inference" in the secondary field "Knowledge" may store or specify a tertiary field value "BodyTemp: 97 F" representing an inference to which the knowledge artifact relates. Some or all of these tertiary field values (e.g., "Gender: Male; Ethnicity: Asian; Age: (20-40)," "BodyTemp: 97 F," etc.) may be generated from the multi-stage NLP operations as discussed herein.

In some embodiments, natural language processor 208 performs grammatical and/or semantic analyses the previously discussed input text to identify phrases (e.g., n consecutive tokens, etc.) that may be used to generate field values for one or more of the primary fields, secondary fields, tertiary fields, etc.

For example, for the keyword "Body Temperature" identified in the primary field "Keywords" as illustrated in FIG. 3A, by way of performing grammatical and/or semantic analysis on the sentence ("The normal body temperature of Asian males between 20 and 40 years of age is 97 F.") of the input text, natural language processor 208 may identify phrases "Asian males between 20 and 40 years of age" and "97 F" to generate a field value for the tertiary fields "subject" and "inference" under the secondary field "Knowledge". Three tokens (or 3-token) "Male", "Asian" and "(20-40)" can be generated from these analyses in connection with the phrase "Asian males between 20 and 40 years of age" (in the sentence of the input text) along with their respective token types "Gender", "Ethnicity" and "Age". These tokens and their respective types can be used as a field value to populate the tertiary field "Subject" Likewise, a token "97 F" can be generated from these analyses in connection with the term "97 F" (in the sentence of the input text) along with its token type "BodyTemp". The token and its type can be used a field value to populate the tertiary field "Inference".

As previously noted, the field value in the primary field "Relates to" identifies the related knowledge neurons for the knowledge neuron ("NEU-HEA-005"). The field value may comprise an array comprising one or more array elements each of which identifies one of the related knowledge neurons. As illustrated in FIG. 3A, the array presently comprises a single array element that comprises a first secondary field "ID" storing or specifying a secondary field value "NEU-HEA-002" that uniquely identifies a related knowledge neuron for the knowledge neuron ("NEU-HEA-005"), and a second secondary field "Weight" storing or specifying a secondary field value "0.6" that indicates a weight of neuron interrelationship between the related knowledge neuron ("NEU-HEA-002") and the knowledge neuron ("NEU-HEA-005").

Neural knowledge learning techniques as described herein may be used to extract information from all the data sources and store keywords and support information for the keywords as knowledge neurons in neural knowledge artifactory 108.

A "Reload" policy may be stored in policy store 114 to specify that a data source is to be reprocessed if any updates are detected to have been made to the data source (e.g., in web 110, etc.). The "Reload" policy may further specify a number of reload selection factors based on which data sources are selected for reloading. Example reload selection factors may include, but are not necessarily limited to only, any of: the age of a data source, recency of updates in the data source, and so forth.

2.4. Neural Knowledge Enhancer

Neural knowledge learner 102 (or neural knowledge enhancer 104) in system 100 may implement, or operate in conjunction with, a dataset extractor (e.g., a subsystem or module implemented with software, hardware or a combination of software and hardware, etc.) that continuously looks at the keywords and the knowledge domains of all knowledge neurons maintained or stored in system 100 or neural knowledge artifactory 108 therein, and tries to find one or more knowledge datasets 118 available in various data repositories in the one or more networks (e.g., web 110, etc.). Knowledge datasets 118 may be used in system 100 to validate knowledge (or knowledge artifacts) captured in knowledge neurons as well as to generate new knowledge neurons.

The datasets may be downloaded by the dataset extractor and passed/provided to neural knowledge enhancer 104 for further processing.

By way of example but not limitation, with respect to the above healthcare example, the dataset extractor tries to find datasets related to the keyword "Body Temperature" available in data repositories located in web 110. Assume that the dataset extractor finds an example dataset in a data repository in web 110. The dataset may be represented in an example schema (e.g., an example tabular form, etc.) as follows:

TABLE 2

| Ethnicity | Age | Gender | BMI | Body Weight | Height | Heart Rate | Normal Body Temp |
|---|---|---|---|---|---|---|---|
| Asian | 32 | Male | 29.9 | 200 pounds | 5.10 | 96 | 98.4 F. |
| Asian | 30 | Male | 24.9 | 150 pounds | 5.10 | 124 | 96.5 F. |
| Asian | 31 | Male | 24.8 | 150 pounds | 5.11 | 124 | 96.5 F. |

The dataset comprises a plurality of property type columns such as "Ethnicity", "Age", "Gender", "BMI", "BodyWeight", "Height", "HeartRate", "NormalBodyTemp", etc. As illustrated in TABLE 2, the dataset comprises three rows. Each row in the rows of the dataset comprises a set of specific properties for these property types and represents a transaction in which all subsets in the set of specific properties occur concurrently.

The dataset downloaded or generated by the dataset extractor may be used by neural knowledge enhancer 104 to run a knowledge extraction process flow implementing a corresponding algorithm/method, for example as illustrated in FIG. 3B. The knowledge extraction process flow can be used to identify one or more different subsets of properties that frequently cooccur together. As used herein, a subset of properties that frequently cooccur together may be referred to as "a frequent subset."

The knowledge extraction algorithm/method can be implemented to follow a "bottom up" approach under which groups of candidate frequent subsets are generated by extending one property (or item) to already identified frequent subsets at a time and the groups of candidate frequent subsets are then tested against the dataset or transactions therein to determine new extended frequent subsets. The knowledge extraction algorithm/method terminates when no new extended frequent subsets (or further successful extensions of already identified frequent subsets) can be found or made.

As illustrated in line 1 of FIG. 3B, initially, a plurality of frequent 1-item subsets (denoted as $L_1$) is identified or determined. The plurality of frequent 1-item subsets comprises (e.g., all, selected, etc.) frequent 1-item knowledge artifacts (denoted as "large 1-itemsets"). As used herein, the term "frequent 1-item knowledge artifact" refers to a subset of property/item that has only a single property (or a single item) determined to be frequently occurring.

In some embodiments, to determine whether a property (or item)—such as any of "Asian", "32", "30", "31", "Male", "29.9", "24.9", "24.8", . . . , "96.5 F", etc., in the dataset as illustrated in TABLE 2 above—is frequently occurring, the process flow (or neural knowledge enhancer 104 implementing the process flow) first determines a support for the property. The support for the property may be represented as a percentage (or support) of transactions (or rows) in which the property occurs. The process flow then compares the support of the property with a minimum support threshold (which may be prefixed or dynamically configurable) denoted as E. In response to determining that the support of the property exceeds the minimum support threshold, the process flow determine that the property is frequently occurring. Otherwise, in response to determining that the support of the property does not exceed the minimum support threshold, the process flow determine that the property is not frequently occurring.

In the present example, frequent 1-item knowledge artifacts each of which is a property with the support exceeding the minimum support threshold may include but are not necessarily limited to only: "Gender: Male" (support 100%), "Ethnicity: Asian" (support 100%), and so forth.

As illustrated in lines 2-10 of FIG. 3B, the knowledge extraction algorithm/method iteratively generates candidate frequent item sets of length k from already identified frequent item sets of length (k−1) and identifies frequent item sets of length k among the candidate frequent item sets. As indicated in line 3 of FIG. 3B, iterations of generating candidate frequent item sets (with length k) and identifying frequent item sets (with length k) end or terminate when it is determined that the already identified frequent item sets in the last iteration (with length (k−1)) do not exist (or represent an empty set).

More specifically, as indicated in line 4 of FIG. 3B, in each iteration, the candidate frequent item sets (denoted as $C_k$) of length k are generated or constructed by extending each frequent item set of the preceding level (with length $(k-_1)$) with an item from other frequent item sets of the preceding level (with length (k−1)) subject to the downward closure lemma in which any extended item set of the current level (with length k) containing subsets that are not in frequent item sets of preceding levels is removed from the candidate frequent item sets ($C_k$) of the current level (with length k).

According to the downward closure lemma, all sub k item sets in a frequent item set of the current level should be frequent item sets of sub k lengths. Thus, as indicated in line 4 of FIG. 3B, the knowledge extraction algorithm/method prunes any candidate item sets (of the current level) that have an infrequent subset of items (or an infrequent sub pattern) from the candidate item sets ($C_k$) of the current level (with length k).

As indicated in lines 5-9 of FIG. 3B, the knowledge extraction algorithm/method scans the dataset (denoted as T) to determine or identify frequent item sets of the current level (with length k) among the candidate item sets ($C_k$) of the current level (with length k).

As indicated in line 6 of FIG. 3B, for each transaction (denoted as t) in the dataset (T), candidate item sets (denoted as $C_t$)—among the candidate item sets ($C_k$) of the current level (with length k)—each of which comprises all properties (or items) that occur (or has support) in the transaction (t) are identified.

As indicated in lines 7 and 8 of FIG. 3B, for each identified candidate item set (denoted as c) in the identified candidate item sets ($C_t$) with all properties occurring in the transaction (t), a count—which may be a field value (denoted as count[c]; initialized to 0) in a data structure representing the identified candidate item set—of the identified candidate item set (c) in the identified candidate item sets ($C_t$) is incremented.

After all the transactions in the dataset (T) are processed, the count of the candidate item set (c) represents a total number of transactions in the dataset (T) in which the candidate item set (c) occurs. The count may be represented in a percentage value (or a normalized value) and compared with the minimum support threshold ε.

As indicated in line 9 of FIG. 3B, the frequent item sets of the current level (with length k) are subsequently identified as those (in the candidate item sets $C_k$) with counts each of which exceeds the minimum support threshold ε. As further indicated in line 10 of FIG. 3B, all frequent item sets of all levels can be determined and returned as knowledge artifacts extracted from the dataset (T).

After the knowledge extraction algorithm/method is applied on the example dataset (T) above, frequent n-item knowledge artifacts (or frequent item sets of length n), where n is an integer greater than one (1), may include, but are not necessarily limited to only: "Gender: Male, Ethnicity: Asian" (support 100%), "Gender: Male, Ethnicity: Asian, HeartRate: 124" (support: 66.67%), "Gender: Male, Ethnicity: Asian, NormalBodyTemp: 96.5 F" (support: 66.67%), "Gender: Male, Ethnicity: Asian, NormalBodyTemp: 96.5 F, HeartRate: 124" (support: 66.67%), and so forth.

Additionally, optionally or alternatively, for each column in some or all columns of a dataset such as illustrated in TABLE 2 above, an aggregation function may be defined or used to aggregate column values (or properties) in each such column into a plurality of different subsets in a set of all possible column values (or all possible variations of properties) in each such column, into a plurality of different subranges in a range of all possible column values (or all possible variations of properties) in each such column, etc. The aggregate function may be defined or specified for a column based at least in part on a distribution of column values (e.g., numeric column values, etc.), as represented in the dataset, in the column.

For a column that comprises properties represented as numeric values, an aggregation function can be defined to aggregate numeric column values (or numeric properties) of the column into a plurality of different numeric value subranges, where the plurality of different numeric value subranges collectively covers a range of possible numeric values (or all possible numeric properties) for the column. Example aggregate functions may include, but are not necessarily limited to only, step functions. For example, the knowledge extraction process flow implemented and/or performed by neural knowledge enhancer may (e.g., automatically, programmatically, etc.) define or specify an aggregate function as a step function for the column "HeartRate", "BMI", etc.

Step values of the step function may or may not be (e.g., automatically, programmatically with no or little human intervention, etc.) determined or set depending on a distribution of numeric values (or properties) as represented in the dataset (T). In some embodiments, group values (or statistics) such as average, maximum, minimum, medium, standard deviation, variance, skew, etc., may be computed based on the distribution of numeric values of properties. The group values may be used to determine or set different step values for different positions/locations in the distributions. For example, finer (or smaller) step values may be used in relatively dense parts of the distribution. Additionally, optionally or alternatively, a range of all possible numeric values for a column may be partitioned (e.g., equally, variably, etc.) into a number (e.g., 10, etc.) of subranges or bins. In some embodiments, step functions as described herein may be (e.g., automatically, programmatically, with no or little user input, with user input, etc.) determined based at least in part on a column type associated with the column.

In an example, the step values of the step function may be a uniform or constant value. In another example, step values may vary, for example ranging from a relatively small value in a relatively dense part of the distribution to a relatively large value in a relatively sparse part of the distribution.

Thus, in various embodiments, step functions and step values therein may or may not be set in dependence on a specific location at which a represented value (or property) in the column is located in the distribution. Under techniques as described herein, any combination of these and other ways of defining or specifying an aggregate function, operational parameters used in the aggregate function, a step function, or step values of the step function dependent on or independent of the distribution of column values can be implemented.

By way of example but not limitation, step values of a first step function "s1" for the "HeartRate" column can be defined or specified (e.g., uniformly, constantly, etc.) as 5. Accordingly, the knowledge extraction algorithm/method considers or deems values in the +/−5 subranges from a represented numeric value (or property) in the "HeartRate" column to be part of the same group. Similarly, step values of a second step function "s2" for the "BMI" column can be defined or specified (e.g., uniformly, constantly, etc.) as 0.1. Accordingly, the knowledge extraction algorithm/method considers or deems values in the +/−0.1 subranges from a represented numeric value (or property) in the "BMI" column to be part of the same group.

After these steps functions "s1" and "s2" with their respective step values are applied on the example dataset (T) above, frequent n-item knowledge artifacts (or frequent item sets of length n), where n is an integer greater than one (1), may include, but are not necessarily limited to only: "Gender: Male, Ethnicity: Asian" (support 100%), "Gender: Male, Ethnicity: Asian, BMI: (24.8:24.9)" (support 66.67%), "Gender: Male, Ethnicity: Asian, HeartRate: 124" (support: 66.67%), "Gender: Male, Ethnicity: Asian, NormalBodyTemp: 96.5 F" (support: 66.67%), "Gender: Male, Ethnicity: Asian, NormalBodyTemp: 96.5 F, HeartRate: 124" (support: 66.67%), "Gender: Male, Ethnicity: Asian, NormalBodyTemp: 96.5 F, HeartRate: 124" (support: 66.67%), "Gender: Male, Ethnicity: Asian, NormalBodyTemp: 96.5 F, HeartRate: 124, BMI: (24.8:24.9)" (support: 66.67%), and so forth.

A number of artifact significance scores (or artifact ranking scores) such as similarity (e.g., as illustrated in expression (2) above, etc.), support, confidence/interlink, lift, etc., may be computed in relation to each knowledge artifact in some or all the frequent n-item knowledge artifacts extracted from the dataset. In some embodiments, each of some or all of the scores computed in relation to a knowledge artifact may be represented as a normalized numeric value in a value range between zero (0) and one (1). Support represents how popular the knowledge artifact is as measured by a proportion of transactions (or rows/records) in which the knowledge artifact (or all properties therein) occurs in the dataset. Interlink is a proportion of transactions (or rows/records) in which the knowledge artifact (denoted as X) and another knowledge artifact (denoted as Y) cooccur. Lift represents how likely another knowledge artifact such as Y will be true when the knowledge artifact (X) occurs in real life, for example as determined or confirmed from the dataset.

Some or all of scores computed for knowledge artifacts can be used to identify relationships and weights of such relationships (e.g., as captured in "Relates to" fields of data structures representing neurons as illustrated in FIG. 3A, etc.) between knowledge artifacts, between neurons generated to encapsulate knowledge artifacts, etc. As used herein, a weight of relationship between two neurons, between two knowledge artifacts, and so forth, may indicate how strongly these two neurons, these two knowledge artifacts, and so forth, relate to each other. In some embodiments, the weight of relationship may be represented as a normalized numeric value in a value range between zero (0) and one (1).

By way of example but not limitation, a lift score may be computed between subject keywords/tokens of two knowledge neurons and/or between inference keywords/tokens of the two knowledge neurons to determine whether two knowledge neurons are related or not. In some embodiments, the two knowledge neurons are determined to be related only if the lift score is determined to be great than a minimum lift score threshold (e.g., 1.0, 1.1, etc.). Additionally, optionally or alternatively, a similarity score may be computed between the subject keywords/tokens of the two knowledge neurons and/or between the inference keywords/tokens of the two knowledge neurons to determine a weight of relationship between the two knowledge neurons.

In some embodiments, scores computed for knowledge artifacts extracted from datasets, documents, etc., from various data sources (or knowledge sources) may be used to filter or recognize patterns in content in the knowledge artifacts extracted from the data sources. These patterns may be used to rank or select specific knowledge artifacts to be included in knowledge neurons as described herein. For instance, scores such as support and lift may be computed for the extracted knowledge artifacts from the dataset and used to filter patterns the content in the extracted knowledge artifacts from the dataset, and to rank or select one or more specific knowledge artifacts, among the extracted knowledge artifacts, to be included in the knowledge neurons.

In the present example, the knowledge extraction process flow may apply a knowledge extraction rule that specifies that extracted knowledge artifacts from a dataset or a data source are to be filtered based on their respective total numbers of properties (or items) in the extracted knowledge artifacts as well as filtered based on their respective support scores. In some embodiments, a knowledge artifact with the highest total number of properties (or items) and with the highest support score is selected from among the extracted knowledge artifacts. Apply this filtering rule, the (e.g., only, etc.) knowledge artifact that will be produced as output from the knowledge extraction process flow for inclusion in a knowledge neuron is: "Gender: Male, Ethnicity: Asian, NormalBodyTemp:96.5 F, HeartRate:124, BMI: (24.8: 24.9)" (support: 66.67%).

In addition, this filtered/selected/learned knowledge artifact may be represented in a new knowledge neuron as illustrated in FIG. 3C.

In some embodiments, before persisting or storing the knowledge neuron (e.g., in neural knowledge artifactory 108, etc.) and updating a global neural schema for persisted knowledge neurons (e.g., in neural knowledge artifactory 108, etc.), neural knowledge enhancer 104 operating with the dataset extractor runs one or more other machine learning (ML) algorithms/methods in addition to the knowledge extraction process flow that implements the corresponding algorithm/method as illustrated in FIG. 3B to valid the learned knowledge artifact. Example ML algorithms/methods used to validate a learned knowledge artifact as described herein may include, but are not necessarily limited to only, any of: regression-based algorithms/methods, neural-network-based algorithms/methods, decision-tree-based algorithms/methods, and so forth.

In the present example, some or all of these ML algorithms/methods may be used to learn or predict a distribution of (e.g., numeric values representing, etc.) "body temperature." For instance, regression may be run or checked based on one or more regression models to predict the body temperature to be in the range of 96 F to 97 F for Asian males between age 20 to 40 with a BMI between 26 and 30 and a heart rate between 110 and 130. Validations from some or all of these other ML algorithms/methods complement the knowledge extraction algorithm/method as illustrated in FIG. 3B and help ensure that the new knowledge neuron generated based on the learned knowledge artifact are accurate.

Techniques as described herein implements self-learning using a variety of AI and/or ML algorithms/methods to generate new knowledge neurons based at least in part on existing knowledge neurons to ensure that the quality of knowledge neurons maintained in neural knowledge artifactory 108 improves continuously over time. Using a combination of diverse AI and/or ML algorithms/methods, these techniques also eradicates or minimize any false information, for example learned from (e.g., data sources found in, etc.) the public web. In some embodiments, new knowledge artifacts found by neural knowledge enhancer 104 (and/or neural knowledge learner 102) that cannot be verified by patterns (e.g., frequently cooccurring properties, etc.) in datasets that system 100 has previously extracted from data sources may be deemed/labeled as unverified knowledge artifacts when such knowledge artifacts are added to neural knowledge artifactory 108. Additionally, optionally or alternatively, a less support/confidence score may be determined based at least in part on a configurable penalty function for, and may be assigned to, each of the knowledge artifacts. In operational scenarios in which the same knowledge artifacts are computed or derived by system 100, or neural knowledge enhancer 104 therein, from other data sources (e.g., other than the previous data sources from which the knowledge artifacts are first found by system 100, etc.), the support/confidence scores of the (e.g., previously unverified, etc.) knowledge artifacts can be increased as determined based at least in part on the penalty function. When the support/confidence scores exceed a configurable threshold, these knowledge artifacts can be deemed/labeled as verified knowledge artifacts.

In some embodiments, a knowledge neuron learned using AI methods from datasets is marked as a type "AI" knowledge neuron as illustrated in FIG. 3C.

Techniques as described herein also determines, for each knowledge neuron to be maintained in neural knowledge artifactory 108, zero, one or more related knowledge neurons maintained in neural knowledge artifactory 108 along one or more respective weights (e.g., 0.87 as illustrated in FIG. 3C, etc.) of relationships. This neuron relationship information can be used by a neural query processor 106 (of FIG. 1) to query right knowledge neurons of neural knowledge artifactory 108 for making decisions, for responding to queries, and so forth.

2.5. Neural Query Processing

Techniques as described herein may use any in a variety of different ways to search for knowledge domains and/or knowledge neurons and/or knowledge artifacts in response to receiving a neural query request against knowledge neurons maintained/stored/cached in system 100.

Figure 3D:
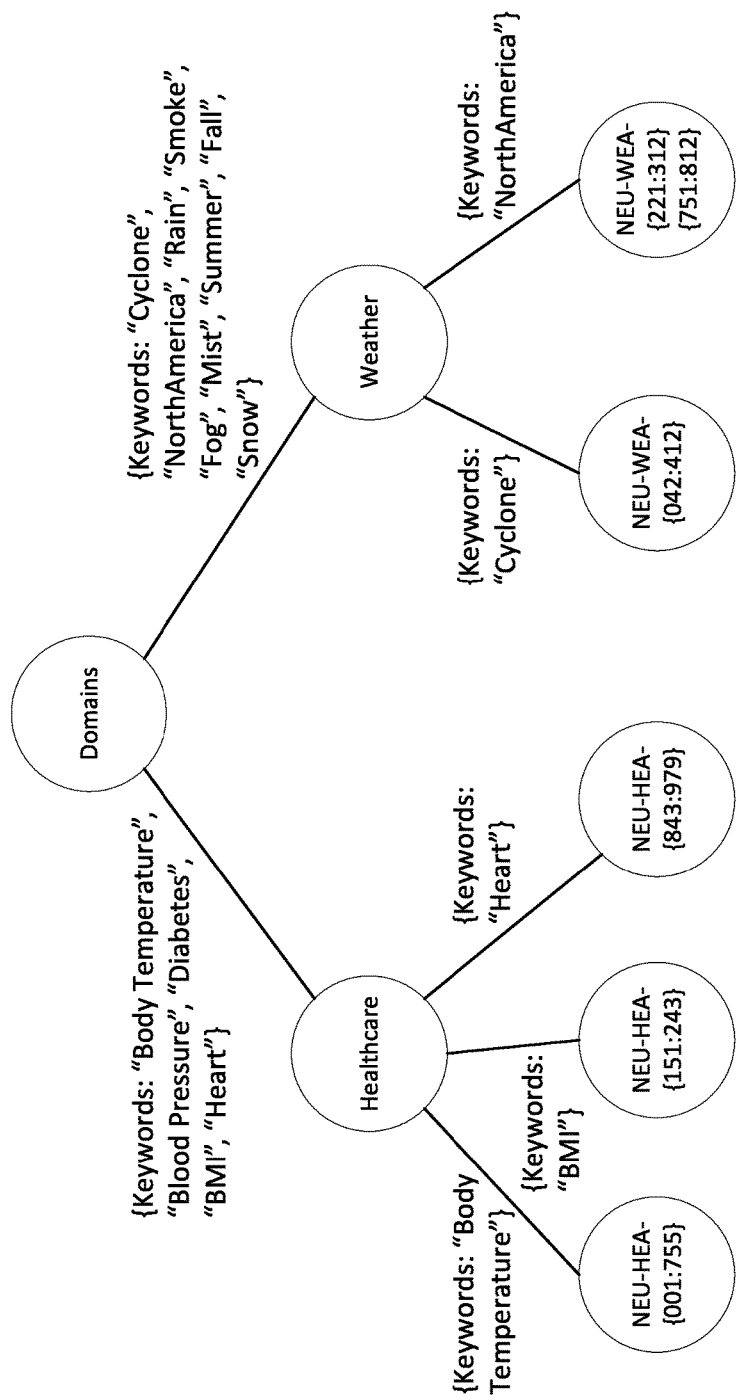
FIG. 3D illustrates an example global neural schema.

By way of illustration but not limitation, knowledge neurons as described herein may be organized based at least in part on a global neural schema such as illustrated in FIG. 3D. The global neural schema may be (e.g., dynamically, in real time, in near real time, at scheduled times, on demand, etc.) updated by neural knowledge learner 102, neural knowledge enhancer 104, etc., to incorporate some or all of a variety (e.g., configuration data, policy data, extracted information from data sources, extracted keywords, etc.) of information related to knowledge domains, knowledge neurons, knowledge artifacts, etc., obtained in real time, in near real time, or in non-real time.

The global neural schema can be made available to or accessed by neural query processor 106 of FIG. 1 in processing neural query requests received by neural query processor 106 of FIG. 1. These neural query requests may, but are not necessarily limited to, be from a client device (e.g., a user computing device operated by a user, an internet-of-things or IoT device, an appliance device, a remote computing device, etc.). Results obtained from accessing and querying the knowledge neurons may be used by neural query processor 106 and/or by query issuing devices in decision making related to one or more knowledge domains, related to one or more control operations, and so forth.

In some embodiments, as illustrated in FIG. 3D, all knowledge domains for which knowledge neurons are generated and maintained/stored/cached in neural knowledge artifactory 108 are represented in the global neural schema.

For the purpose of illustration only, two knowledge domains, namely "Healthcare" and "Weather", are shown. It should be noted that, in various embodiments, fewer or more knowledge domains may be represented in a global neural schema as described herein. Additionally, optionally or alternatively, different knowledge domains other than "Healthcare" and "Weather" may be represented in the global neural schema in addition to, or in place of, the knowledge domains "Healthcare" and "Weather".

As illustrated in FIG. 3D, each knowledge domain may be represented as a child node (at the second hierarchical level of the global neural schema) under the root node "Domains" (or the top hierarchical level of the global neural schema) representing a collection of (e.g., all, etc.) knowledge domains supported by neural knowledge artifactory 108.

All knowledge neurons in a knowledge domain may be represented as one or more child nodes under a parent node representing the knowledge domain. As illustrated in FIG. 3D, one or more child nodes representing all knowledge neurons in a knowledge domain "Healthcare" may comprise child nodes "NEU-HEA-{001:755}", "NEU-HEA-{151:243}", "NEU-HEA-{843:979}", etc., under the parent node representing the knowledge domain "Healthcare". Similarly, one or more child nodes representing all knowledge neurons in a knowledge domain "Weather" may comprise child nodes "NEU-WEA-{042:412}", "NEU-WEA-{221:312}{751:812}", etc., under the parent node representing the knowledge domain "Weather".

Each child node of the one or more child nodes may comprise information that identifies a respective (e.g., proper, etc.) subset of knowledge neurons in all the knowledge neurons in the knowledge domain. In some embodiments, subsets of knowledge neurons represented by different child nodes under a knowledge domain may be non-overlapping. In some other embodiments, subsets of knowledge neurons represented by different child nodes under a knowledge domain may be overlapping. Each such child node may use a data construct such as a combination of one or more lists, ranges, arrays, sets, sequences, etc., to identify the respective subset of knowledge neurons represented by that child node.

A parent node of a higher hierarchical level in the global neural schema can be linked or connected to a child node of a lower hierarchical level in the global neural schema by an edge. An inter-node relationship between the parent node and the child node as represented by the edge may specify one or more keywords (as edge properties) that can be used by neural query processor 106 to match with (or to find a similarity, affinity, and/or subordinate relationship with) query keywords for the purpose of traversing from the parent node to the child node. Additionally, optionally or alternatively, the edge connecting the parent node to the child node in the global neural schema can have or specify any number of edge properties (e.g., in addition to or in place of a set of keywords, etc.) similar to specifying a set of the one or more keywords as the edge properties of the edge as discussed above.

In cases that the child node in the inter-node relationship represents a knowledge domain, the keywords specified with (or for) the edge represent keywords already extracted, recognized, identified and/or established for the knowledge domain; for example, these keywords have been extracted, recognized, identified and/or established for the knowledge domain, based on contents/documents of selected data sources for the knowledge domain, by way of performing NLP operations on the contents/documents.

On the other hand, in cases that the child node in the inter-node relationship represents a subset of knowledge neurons in a knowledge domain, the keywords specified with the edge represent keywords already extracted, recognized, identified and/or established for the subset of knowledge domains; for example, these keywords have been extracted, recognized, identified and/or established for the subset of knowledge neurons in the knowledge domain, based on contents/documents of selected data sources for the knowledge domain, by way of performing NLP operations on the contents/documents.

As illustrated in FIG. 3D, keywords specified with (or for) an edge connecting the root node "Domains" to a child node representing the knowledge domain "Healthcare" comprises "Body Temperature," "Blood Pressure," "Diabetes", "BMI", "Heart", etc. These keywords have been extracted, recognized, identified and/or established for the knowledge domain "Healthcare", based on contents/documents of selected data sources for the knowledge domain "Healthcare".

Similarly, keywords specified with (or for) an edge connecting the root node "Domains" to a child node representing the knowledge domain "Weather" comprises "Rain", "Smoke", "Fog", "Mist", "Summer", "Fall", "Snow", etc. These keywords have been extracted, recognized, identified and/or established for the knowledge domain "Weather", based on contents/documents of selected data sources for the knowledge domain "Weather".

As also illustrated in FIG. 3D, keywords specified with (or for) an edge connecting a parent node representing a knowledge domain "Healthcare" to a child node representing a subset of knowledge neurons "NEU-HEA-{001:755}" in the knowledge domain "Healthcare" comprises "Body Temperature," etc. These keywords have been extracted, recognized, identified and/or established for the subset of knowledge neurons in the knowledge domain "Healthcare" as represented by the child node, based on contents/documents of selected data sources for the knowledge domain "Healthcare".

Similarly, keywords specified with (or for) an edge connecting a parent node representing a knowledge domain "Healthcare" to a child node representing a subset of knowledge neurons "NEU-HEA-{151:243}" in the knowledge domain "Healthcare" comprises "BMI", etc. These keywords have been extracted, recognized, identified and/or established for the subset of knowledge neurons in the knowledge domain "Healthcare" as represented by the child node, based on contents/documents of selected data sources for the knowledge domain "Healthcare".

Keywords specified with (or for) an edge connecting a parent node representing a knowledge domain "Healthcare" to a child node representing a subset of knowledge neurons "NEU-HEA-{843:979}" in the knowledge domain "Healthcare" comprises "Heart", etc. These keywords have been extracted, recognized, identified and/or established for the subset of knowledge neurons in the knowledge domain "Healthcare" as represented by the child node, based on contents/documents of selected data sources for the knowledge domain "Healthcare".

Keywords specified with (or for) an edge connecting a parent node representing a knowledge domain "Weather" to a child node representing a subset of knowledge neurons "NEU-WEA-{042:412}" in the knowledge domain "Weather" comprises "Cyclone", etc. These keywords have been extracted, recognized, identified and/or established for the subset of knowledge neurons in the knowledge domain "Weather" as represented by the child node, based on contents/documents of selected data sources for the knowledge domain "Weather".

Keywords specified with (or for) an edge connecting a parent node representing a knowledge domain "Weather" to a child node representing a subset of knowledge neurons "NEU-WEA-{221:312}{751:812}" in the knowledge domain "Weather" comprises "NorthAmerica", etc. These keywords have been extracted, recognized, identified and/or established for the subset of knowledge neurons in the knowledge domain "Weather" as represented by the child node, based on contents/documents of selected data sources for the knowledge domain "Weather".

By way of traversing the global neural schema, a set of specific knowledge neuron identifiers for knowledge neurons responsive to a neural query may be identified from the global neural schema. A knowledge neuron in the related knowledge neurons may be uniquely identified by a neural ID that is unique among different neural IDs assigned to different knowledge neurons. The knowledge neuron may be (e.g., directly, indirectly, etc.) queried and accessed using the neural ID assigned to (or generated for) the knowledge neuron.

More specifically, neural query processor 106 can query the global neural schema by way of comparing query keywords derived from the neural query and keywords specified for edges and/or nodes in the global neural schema to find, or traverse through, appropriate child nodes to get/obtain specific neural IDs of relevant knowledge neurons. Neural query processor 106 can then use the specific neural IDs obtained from the global neural schema to query and retrieve information (e.g., knowledge artifact(s), etc.) from the knowledge neurons maintained, stored and/or cached in neural knowledge artifactory 108.

Additionally, optionally or alternatively, other query criteria, which may or may not be based on the neural ID, may be used to query or access the knowledge neuron in addition to, or in place of, the neural ID assigned to (or generated for) the knowledge neuron.

By way of illustration but not limitation, an IoT smart thermostat application (e.g., one or more of 120-1 through 120-3 of FIG. 1, etc.) that automatically controls turning on/off an air conditioner based on room temperatures can access and use neural query processor 106 (by sending a neural query to neural query processor 106) to determine whether the air conditioner should be turned on or off at a given time for a specific user.

In some embodiments, an application (e.g., a remote application, a local application, a mobile application, an embedded application, etc.) that queries neural knowledge artifactory 108 defines one or more query component objects (e.g., computer-implemented objects, data fields, groups of data fields, data structures or sub-structures, etc.) such as a subject profile, a predicate profile, etc. A subject profile may be used to contain query information about a subject for which the neural query is made. A predicate profile may be used to contain the information (e.g., criteria, value ranges, etc.) requested about the subject.

In the present IoT Smart Thermostat application example, the subject profile may comprise some or all of a user profile of a person, demographic information of a location (where the person is located), and so forth. The predicate profile may comprise some or all of a tolerable temperature range for the person with the user profile included in the subject profile.

Under techniques as described herein, a neural query sent by an application to query neural knowledge artifactory 108 can be formatted in a message/file format including but not limited to any of: HTML, XML, JSON, and so forth. An example JSON message/file representing the neural query sent by the IoT Smart Thermostat application with a neural query API call (e.g., named "neuralQueryApi", etc.) is illustrated in TABLE 3 as follows.

TABLE 3

| | |
|---|---|
| 1. | POST/ninja/neuralQueryApi/1.0/HTTPS/search |
| 2. | HOST: ninja.tejas.ai |
| 3. | X-Auth: 12ab34cd56ef78ab90cd12ef34ab56cd |
| 4. | Content-Type: application/json |
| 5. | { |
| 6. |   "Subject Profile": { |
| 7. |     "Country": "USA", |
| 8. |     "City": "Los Angeles", |
| 9. |     "age of sensor": 2d, |
| 10. |     "Room size": 200 Sq ft, |
| 11. |     "Cooler capacity": 1T, |
| 12. |     "User Heart Rate": 96, |
| 13. |     "User BMI": 24.8 |
| 14. |   }, |
| 15. |   "Predicate Profile": { |
| 16. |     "Preferred_Temperature": NA |
| 17. |   }, |
| 18. |   "Temperature": 70.0F |
| 19. |   ... |
| 20. | } |

As can be seen in TABLE 3 above, the neural query or query related profiles contained therein may include a number of data fields populated by a number of field values. Field values of some or all of the data fields in the neural query may be used as query keywords in subsequent query processing. These query keywords may be compared with keywords represented in edges and/or nodes of the global neural schema to trigger or enable a lookup (or a traversal) in the global neural schema as illustrated in FIG. 3D.

For example, in response to receiving the neural query from the IoT smart thermostat application over the one or more networks, neural query processor 106 can use the neural query to determine query keywords such as "Temperature" and other query keywords and/or other information/criteria/factors such as age, gender, etc., from the specific user's user profile. Some or all the query keywords and the other information/criteria/factors can be determined from the neural query or content therein. Based on the keywords and the other information/criteria/factors, neural query processor 106 finds specific neural IDs for all relevant knowledge neurons by traversing through nodes represented in the global neural schema.

In the present example, the query keywords used in the lookup per the neural query illustrated in TABLE 3 above may include, but are not necessarily limited to only, some or all of: "Country: USA", "City: Los Angeles", "age of sensor: 2 d", "room size: 200 Sq ft", "Cooler Capacity: 1 T", "User Heart Rate: 96", "User BMI: 24.8", "Preferred_Temperature" (with null value), "Temperature: 70.0 F" (e.g., current room temperature, last measured room temperature, etc.), and so forth.

Figure 3E:
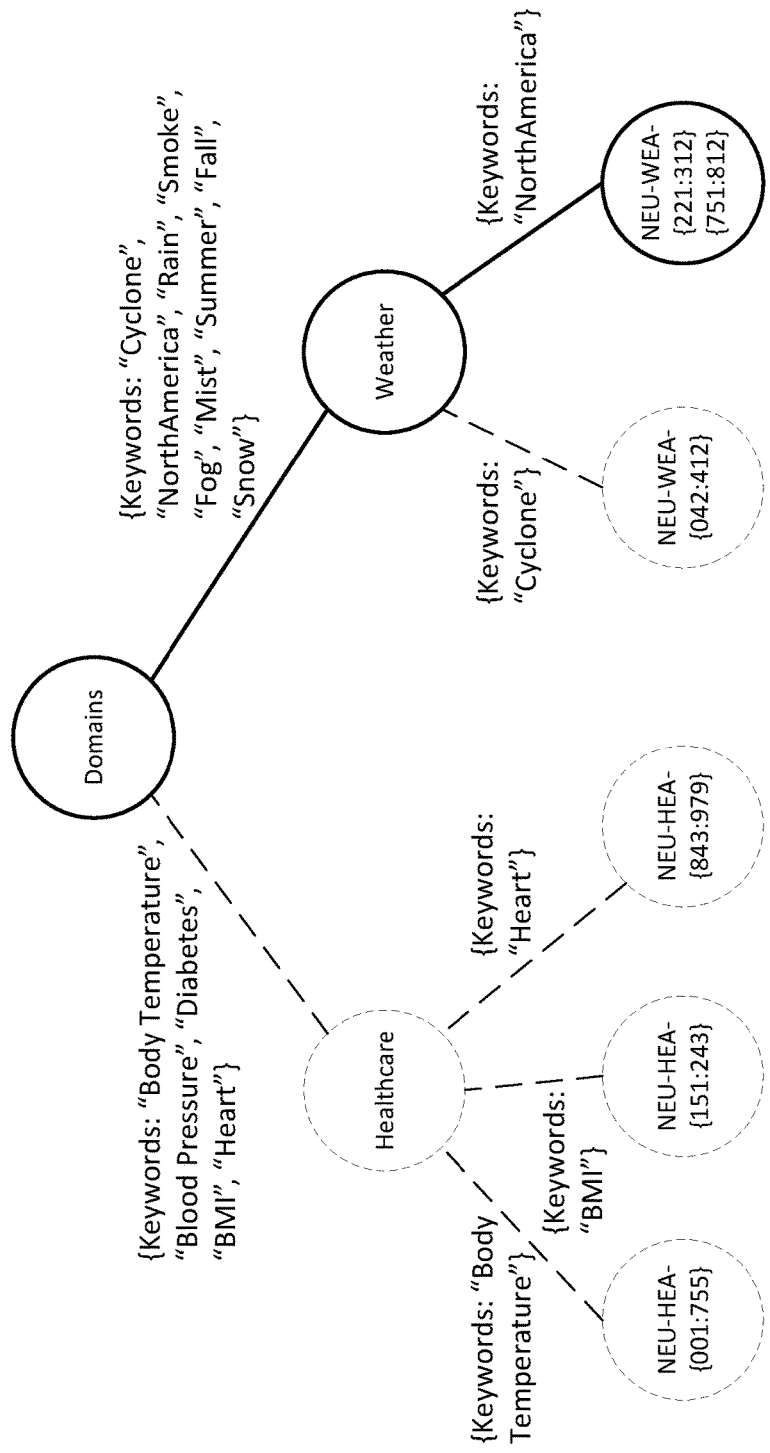
FIG. 3E and FIG. 3F illustrate example sub-schemas traversed with keywords from queries or updates.

FIG. 3E illustrates an example sub-schema (in the global neural schema) traversed in a depth-first manner with the query keywords "Country: USA" and "City: Los Angeles." More specifically, neural query processor 206 may start traversal at the root node "Domains" (at the top hierarchical level of the schema) representing all knowledge domains supported in the neural knowledge artifactory 108; determine that these query keywords represent locations in North America and thus are related to (or have one or more similarity, affinity, and/or subordinate relationships with) the keyword "NorthAmerica" specified for a first edge (from the top hierarchical level to the second hierarchical level of the schema) connecting the root node to a child node "Weather" representing the knowledge domain "Weather"; use the first edge to traverse to the node "Weather" (at the second hierarchical level of the schema); further determine that the keyword "NorthAmerica" specified for the first edge is also specified for a second edge connecting the node "Weather" to a child node "NEU-WEA-{221:312}{751:821}" comprising a data construct (e.g., lists, etc.) for knowledge neurons (in the knowledge domain "Weather") related to the keywords such as "NorthAmerica", etc., specified for the second edge; use the second edge to traverse to the child node "NEU-WEA-{221:312}{751:821}".

Based on the child node's data construct that identifies relevant knowledge neurons (in the knowledge domain "Weather") related to (e.g., containing, etc.) the keywords such as "NorthAmerica", etc., these knowledge neurons with neural IDs falling within a first neural ID range of NEU-WEA-221 to NEU-WEA-312 and a second neural ID range of NEU-WEA-751 to NEU-WEA-812 are searched for the purpose of obtaining relevant knowledge artifacts. These relevant knowledge artifacts included in the knowledge neurons may be collected in the past before, and/or contemporaneously with, query processing as described herein. From these knowledge artifacts, neural query processor 106 locates, determines, and/or establishes, one or more neural knowledge items for decision making, including but not limited to: the current "outside_temperature" (e.g., in real time, in near real time, from the latest measurements/forecasts, etc.) in Los Angeles, the "Preferred_Temperature" of people reported in that location, etc. For example, the preferred temperature of people in that location may be determined as 70 F based on the knowledge artifacts represented in the knowledge neurons.

Figure 3F:
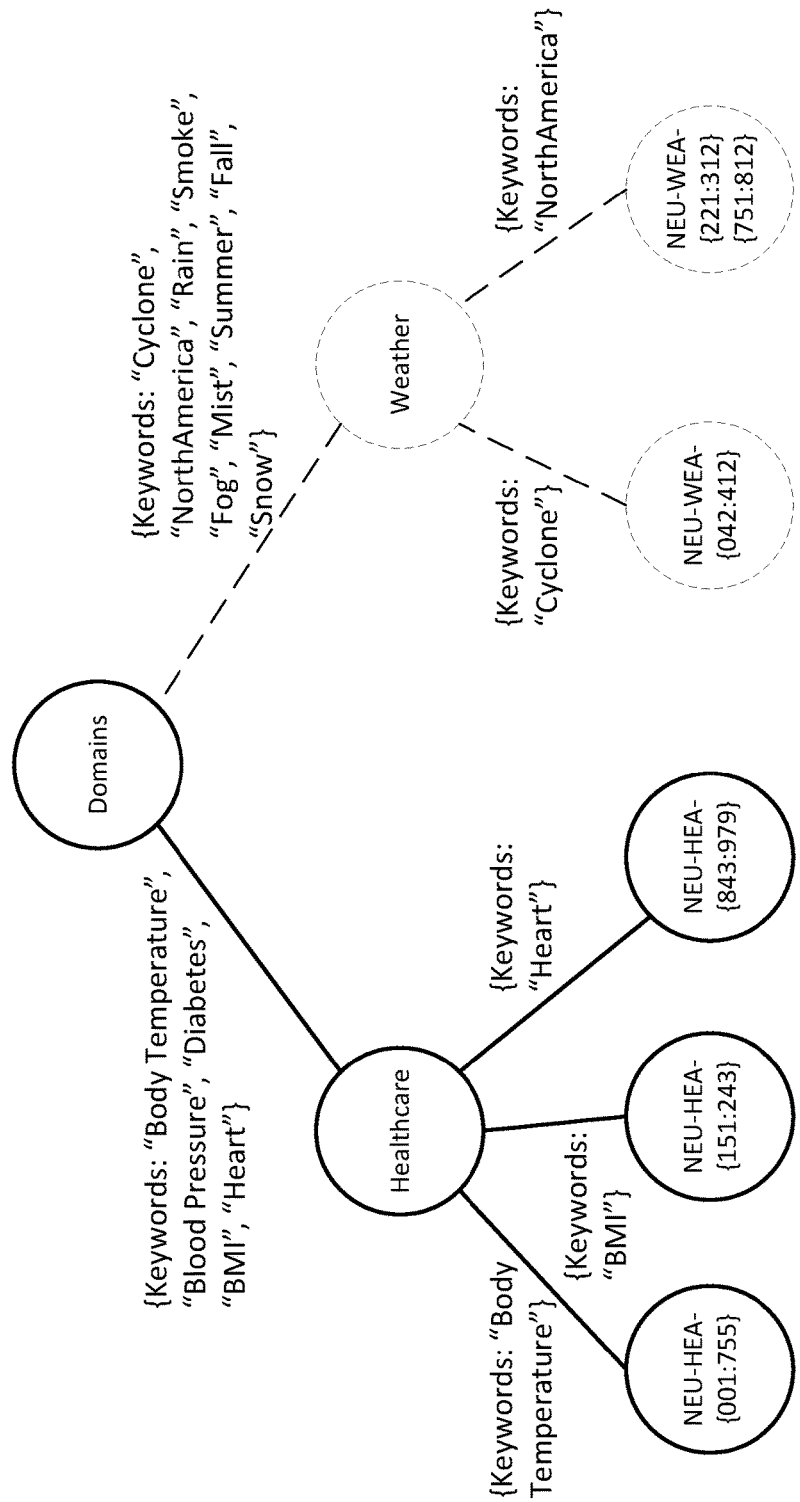

FIG. 3F illustrates an example sub-schema (in the global neural schema) traversed in a depth-first manner with the query keywords "User Heart Rate: 96" and "User BMI: 24.8". More specifically, neural query processor 206 may start traversal at the root node "Domains" (at the top hierarchical level of the schema) representing all knowledge domains supported in the neural knowledge artifactory 108; determine that these query keywords have one or more similarity, affinity, and/or subordinate relationships with the keywords "Body Temperature," "Heart", "BMI", etc., specified for a third edge (from the top hierarchical level to the second hierarchical level of the schema) connecting the root node to a child node "Healthcare" representing the knowledge domain "Healthcare"; use the third edge to traverse to the node "Healthcare" (at the second hierarchical level of the schema); further determine that the keyword "Body Temperature" specified for the third edge is also specified for a fourth edge connecting the node "Healthcare" to a child node "NEU-HEA-{001:755}" comprising a data construct (e.g., lists, etc.) for knowledge neurons (in the knowledge domain "Healthcare") related to the keywords such as "Body Temperature," etc., specified for the fourth edge; use the fourth edge to traverse to the child node "NEU-HEA-{001:755}".

Based on the child node's data construct that identifies relevant knowledge neurons (in the knowledge domain "Healthcare") related to (e.g., containing, etc.) the keywords such as "Body Temperature," etc., these knowledge neurons with neural IDs falling within a third neural ID range of NEU-HEA-001 to NEU-HEA-755 are searched for the purpose of obtaining relevant knowledge artifacts. These relevant knowledge artifacts included in the knowledge neurons may be collected in the past before, and/or contemporaneously with, query processing as described herein.

Similarly, neural query processor 206 may determine, after using the third edge to traverse to the node "Healthcare" (at the second hierarchical level of the schema), that the keyword "BMI" specified for the third edge is also specified for a fifth edge connecting the node "Healthcare" to a child node "NEU-HEA-{151:243}" comprising a data construct (e.g., lists, etc.) for knowledge neurons (in the knowledge domain "Healthcare") related to the keywords such as "BMI", etc., specified for the fifth edge; use the fifth edge to traverse to the child node "NEU-HEA-{151:243}".

Based on the child node's data construct that identifies relevant knowledge neurons (in the knowledge domain "Healthcare") related to (e.g., containing, etc.) the keywords such as "BMI," etc., these knowledge neurons with neural IDs falling within a fourth neural ID range of NEU-HEA-151 to NEU-HEA-243 (e.g., excluding knowledge neurons that have been searched in the present query processing, etc.) are searched for the purpose of obtaining relevant knowledge artifacts. These relevant knowledge artifacts included in the knowledge neurons may be collected in the past before, and/or contemporaneously with, query processing as described herein.

Similarly, neural query processor 206 may determine, after using the third edge to traverse to the node "Healthcare" (at the second hierarchical level of the schema), that the keyword "Heart" specified for the third edge is also specified for a sixth edge connecting the node "Healthcare" to a child node "NEU-HEA-{843:979}" comprising a data construct (e.g., lists, etc.) for knowledge neurons (in the knowledge domain "Healthcare") related to the keywords such as "Heart", etc., specified for the sixth edge; use the sixth edge to traverse to the child node "NEU-HEA-{843:979}".

Based on the child node's data construct that identifies relevant knowledge neurons (in the knowledge domain "Healthcare") related to (e.g., containing, etc.) the keywords such as "Heart," etc., these knowledge neurons with neural IDs falling within a fifth neural ID range of NEU-HEA-843 to NEU-HEA-979 (e.g., excluding knowledge neurons that have been searched in the present query processing, etc.) are searched for the purpose of obtaining relevant knowledge artifacts. These relevant knowledge artifacts included in the knowledge neurons may be collected in the past before, and/or contemporaneously with, query processing as described herein.

From the knowledge artifacts from searching the knowledge neurons in the second, third, and fourth ranges of neural IDs, neural query processor 106 locates, determines, and/or establishes, one or more neural knowledge items for decision making, including but not limited to: the "Preferred Room Temperature" of people with a heart rate of 96 and BMI of 24.8, etc. For example, the preferred temperature of people with heart rate of 96 and BMI of 24.8 may be determined, estimated, and/or predicted, as 68 F based on the knowledge artifacts represented in the knowledge neurons.

In some embodiments, the neural query may be sent from the IoT application to neural query processor 106 by invoking a neural query API call (e.g., named "neuralQueryApi", causing a neural query as illustrated in TABLE 3 to be sent to system 100, etc.) supported by system 100 or neural query processor 106 therein.

Under techniques as described herein, a neural query response sent to an application can be formatted in a message/file format including but not limited to any of: HTML, XML, JSON, and so forth. For example, in response to receiving the neural query from the IoT application as illustrated in TABLE 3, neural query processor 106 can use the same neural query API (e.g., "neuralQueryApi", etc.) to send to the IoT application a query response at least in part formatted in a message/file format as illustrated in TABLE 4 below.

TABLE 4

| 1. | Response: |
| 2. | { |
| 3. | "Predicate Profile": { |
| 4. | "Preferred_Temperature": 68F-70F |
| 5. | } |
| 6. | } |

Based on the knowledge artifacts in the searched knowledge neurons, neural query processor 106 sets or specifies, in the query response as illustrated in TABLE 4 above, the preferred temperature range as 68 F to 70 F since the preferred temperature of people with health records as reported/specified/inputted in the subject profile is 68 F and the average preferred temperature of others in the location is 70 F.

The query response helps the IoT application make an informed decision on whether and when to turn on or off the air conditioner in the room, even if there is no historic data about the usage of the air conditioner in the past. Additionally, optionally or alternatively, every time the air conditioner is turned on or off by the user of the air conditioner, the IoT application can send a neural feedback to system 100 for knowledge neurons in neural knowledge artifactory 108 to learn more specific user preferences so that future query responses can be even more granular and accurate than in the past. This mechanism of sending neural feedbacks to system 100 to update the knowledge neurons or knowledge artifacts therein in neural knowledge artifactory 108 is described in detail in the next section.

Under techniques as described herein, each knowledge neuron (including some or all knowledge neurons related to each such knowledge neuron) can be located, for example, in a depth-first search. Knowledge artifacts represented in the knowledge neurons can be used to help a wide variety of applications (including but not limited the IoT application)

make correct decisions in a wide variety of circumstances. For example, query responses from system 100 based on these knowledge artifacts represented in the knowledge neurons can help decide: "Normally Asian males tend to turn on the air-conditioner when the room temperature is 78 F, but Asian males between age 20 to 25 turn on the air-conditioner when the room temperature is 74 F."

Additionally, optionally or alternatively, the knowledge artifacts may include those filtered and extracted from contents already available in a wide variety of data sources (e.g., in web 110 of FIG. 1, in one or more networks, etc.). Thus, system 100 can help these applications make correct decisions even in cases of cold starts in which no or little training data and/or test data are available for robust and accurate machine learning. In the meantime, system 100 can continuously filter and extract up-to-date knowledge artifacts from data sources, receive neural feedbacks from a variety of applications, gather training data and/or test data for machine learning, etc., for the purpose of generating/updating knowledge neurons and improving the accuracy of predictions/decisions.

For the purpose of illustration, it has been described that performs a depth first search may be made with regards to knowledge neurons whose identification information are represented in a global neural schema such as illustrated in FIG. 3D through FIG. 3F. In various embodiments, searches in other manners through knowledge neurons represented in the global neural schema as maintained in neural knowledge artifactory 108 may be used to determine or identify relevant knowledge neuron in relation to processing a neural query received by system 100.

2.6. Continuous Neural Feedback Processing

System 100, or neural knowledge enhancer 104 therein, also receives continuous (e.g., real time, near real time, non-real time, etc.) neural feedbacks from applications (e.g., remote applications, local applications, mobile applications, embedded applications, etc.) that may query knowledge neuron maintained in neural knowledge artifactory 108. These neural feedbacks can be used to continuously update existing knowledge neurons and create new knowledge neurons in neural knowledge artifactory 108 to ensure that system 100 is self-learning incrementally over time.

An application as described herein can invoke a neural query API call (e.g., named "neuralQueryApi", etc.) to cause a neural feedback to be sent to system 100 for the purpose of providing information to be included in knowledge neurons maintained/stored/cached in neural knowledge artifactory 108.

The neural feedback comprises one or more neural feedback components such as a subject profile, feedback profile, etc. The subject profile contains feedback information about a subject for which the neural feedback is sent. The feedback profile contains the information given as feedback about the subject. In some embodiments, an application that registers to use neural query API calls (e.g., "neuralQueryApi", etc.) can be configured to provide a callback URL that the neural query API call "neuralQueryApi" can poll for further neural feedbacks. The callback URL may be accessed or used by system 100 to proactively obtain or retrieve further neural feedbacks in case the application is not sending timely these neural feedbacks to system 100.

Under techniques as described herein, a neural update sent by an application to update neural knowledge artifactory 108 can be formatted in a message/file format including but not limited to any of: HTML, XML, JSON, and so forth. An example JSON message/file representing a neural feedback sent by the previously mentioned IoT smart thermostat application is illustrated in TABLE 5 as follows.

TABLE 5

| | |
|---|---|
| 1. | POST /ninja/neuralQueryApi/1.0/ HTTPS/feedback |
| 2. | HOST: ninja.tejas.ai |
| 3. | X-Auth: 12ab34cd56ef78ab90cd12ef34ab56cd |
| 4. | Content-Type: application/json |
| 5. | { |
| 6. |   "Subject Profile": { |
| 7. |     "Country": "USA", |
| 8. |     "City": "Los Angeles", |
| 9. |     "age of sensor": 2d, |
| 10. |     "Room size": 200 Sq ft, |
| 11. |     "Cooler capacity": 1T, |
| 12. |     "User Heart Rate": 96, |
| 13. |     "User BMI": 24.8 |
| 14. |   }, |
| 15. |   "Feedback Profile": { |
| 16. |     "Action": "Air conditioner on" |
| 17. |     "Temperature": "70F" |
| 18. |   } |
| 19. | } |

As can be seen in TABLE 5 above, the neural feedback or feedback related profiles contained therein may include a number of data fields populated by a number of field values. Field values of some or all of the data fields in the neural feedback may be used as feedback keywords in subsequent feedback processing. These feedback keywords may be compared with keywords represented in edges and/or nodes of the global neural schema to trigger or enable a lookup (or a traversal) in the global neural schema as illustrated in FIG. 3D.

For example, in response to receiving the neural feedback from the IoT smart thermostat application over the one or more networks, neural knowledge enhancer 104 can use the neural feedback to determine feedback keywords such as "Temperature" and other feedback keywords and/or other information/criteria/factors such as age, gender, etc., from the specific user's user profile. Some or all the feedback keywords and the other information/criteria/factors can be determined from the neural update or content therein. Based on the keywords and the other information/criteria/factors, neural knowledge enhancer 104 finds specific neural IDs for all relevant knowledge neurons by traversing through nodes represented in the global neural schema.

In the present example, the feedback keywords used in the lookup per the neural update illustrated in TABLE 5 above may include, but are not necessarily limited to only, some or all of: "Country: USA", "City: Los Angeles", "age of sensor: 2 d", "room size: 200 Sq ft", "Cooler Capacity: 1 T", "User Heart Rate: 96", "User BMI: 24.8", "Action", "Temperature", and so forth.

In some embodiments, as a part of processing the neural feedback provided by way of the neural API call (e.g., "neuralQueryApi", etc.), neural knowledge enhancer 104 uses the keywords in the neural update, including but not necessarily limited to the keywords in the subject profile therein, to search or traverse the global neural schema as illustrated in FIG. 3D through FIG. 3F, similar to using keywords to search or traverse the global neural schema for the neural query as previously discussed in connection with processing neural queries.

Neural knowledge enhancer 104 identifies relevant knowledge neurons through searching or traversing the global neural schema and update some or all of these relevant knowledge neurons with neural knowledge update information carried in the neural feedback.

In some embodiments, in response to identifying the relevant knowledge neurons, neural knowledge enhancer 104 creates an history object based on the neural knowledge update information obtained from the neural feedback and uses the history object to update some or all of the relevant knowledge neurons along with a timestamp. In an example, the timestamp may be obtained from a data field value in the neural feedback directly. In another example, the timestamp may be generated by system 100 to indicate when the neural feedback was received.

In the IoT smart thermostat application case, neural knowledge enhancer 104 can update a relevant knowledge neuron (e.g., as illustrated in FIG. 3A, etc.) with the neural knowledge update information to indicate that the user turned on the air conditioner at 70 F along with the timestamp as discussed above to generate an updated relevant knowledge neuron as illustrated in FIG. 3G.

In many operational scenarios, just recording a history of feedbacks in knowledge neurons is not sufficient or helpful for making accurate recommendations in processing subsequent queries. In some embodiments, one or more best or optimal values for one or more decision making information items to be provided with a knowledge neuron may be predicted and/or updated (e.g., in advance, periodically, from time to time, on demand, after a set number of neural feedbacks are received, etc.) in the knowledge neuron (and/or possibly related knowledge neurons) based on one or more feedbacks relevant to the knowledge neuron are received. Example decision making information items to be predicted and/or updated with best or optimal values may include, preferred temperature, preferred operational mode of a device, preferred operational decision, etc., as predicted with one or more knowledge neurons as described herein.

As a result of proactively incorporating or accommodating neural knowledge update information from neural feedbacks, knowledge neurons as described herein can be used to ensure that decision making information items provided to (client) applications in future neural queries with same or similar query profiles provide relatively accurate recommendations to these applications.

Techniques as described herein may implement some or all of a variety of data science methods such as machine learning based methods, statistics-based methods, and so forth, to analyze neural feedback information from neural feedbacks as described herein. By way of example but not limitation, an example method/algorithm used to update knowledge neurons based on neural feedback from applications is given below.

In some embodiments, system 100, or neural knowledge enhancer 104 as described herein, uses the neural feedbacks to generate a plurality of historic feedback datapoints comprising a plurality of samples x1, x2, . . . , xn, and a corresponding plurality of labels or observed values denoted as y1, y2, . . . , yn, where n represents an integer greater than one (1).

A sample xi, where i is an integer between one (1) and n, may, but is not limited to only, be represented as a vector (or array) of numbers (e.g., integers, floating-point numbers, binary numbers, enumerations or enums, etc.). A label or an observed value yi, where i is an integer between one (1) and n, may, but is not limited to only, be represented as a scaler. For instance, each historic feedback datapoint may comprise a vector of properties of the subject (e.g., age as an integer number, gender as a binary number or an enum, BMI as a floating-point number, ethnicity as an enum, etc.). A label or observed value may comprise a scalar value such as a preferred temperature.

System 100, or neural knowledge enhancer 104 therein, may be configured to determine a function "f*" (e.g., an estimator, a predictor, a mapping, etc.) linking data points x and labels y such that the function "f*" (e.g., approximately, etc.) maps the data points x to their respective labels y, or f*(x)≈y.

Due to inherent nature (e.g., uncertainty, errors/noises in observations, existence of other possibly unknown variables, insufficient number of combinations of samples and observed values for labels, etc.) of the problem to map data points to their corresponding labels, in general, it may be impossible to determine accurately an exact form for the function "f*". However, under techniques as described herein, a reasonable approximation of the function "f*" can still be learned, for example continuously with more and more improvement in accuracy over time.

A variety of function forms with a variety of functional parameters may be used for the purpose of determining the function "f*". Denote the i-th predicted label to be estimated or predicted for the i-th sample xi as f(xi), where i is an integer between one (1) and n. By way of example but not limitation, the function "f*" may take a function form as follows:

$$f(x) = x^T w \qquad (3)$$

where $x^T$ represents a vector formed by the samples x1, x2, . . . , xn, for which the actual labels (or observed values) y1, y2, . . . , yn, are obtained from the neural feedbacks; and w represents a weight vector formed by n weight factors wi, where i is an integer between one (1) and n.

Here the selected function form takes a form of dot products between a vector formed by the samples xi and a weight vector w formed by the weight factors. Note that the function may map the samples xi to predicted values that may be approximate to the actual labels (or observed values) yi, unless there is no error in prediction/estimation by the function "f*", which may be unlikely.

In some embodiments, system 100, or neural knowledge enhancer 104 therein, can determine the form of the function "f*" (or the weight factors in the weight factor used in the dot products as mentioned above) by minimizing an error between predicted labels (or predicted values) and actual labels (or observed values) using an objective function such as the square of the difference between the predicted labels and the actual labels as follows:

$$\min \sum_{i=1}^{n} (y_i - x_i^T w)^2 + \lambda \|w\|^2 \qquad (4)$$

where $(y_i - x_i^T w)^2$ represents the i-th error or the square of the difference between the i-th predicted label (or predicted value) and the i-th actual label (or observed value); $\|w\|^2$ represents the square of the norm of the weight vector w, which is equal to $w^T w$ (or the square of the magnitude $\|w\|$ of the weight factor vector); and $\lambda$ represents a regularization parameter (e.g., for convergence purposes in numerical computations, etc.). This second term may not be completely obvious, but the presence of this term may be helpful in improving the generalization ability of neural knowledge learning/enhancement.

All the historic datapoints (or samples xi) and the labels, as obtained from the neural feedbacks, can be put into, or represented by, a matrix X (or a vector of vectors) and vector y, respectively. The i-th row of X may represent the i-th sample (or xi, which may be a vector of properties such as those in the subject profile as mentioned above). Similarly, the i-th element of y may represent a corresponding (actual) label (or observed value).

A closed-form solution to the optimization problem as represented in expression (4) above can be given as follows:

$$w=(X^TX+\lambda I)^{-1}X^Ty \qquad (5)$$

where I represents the identity matrix

Once w is computed and determined as shown in expression (5) above, system 100, or neural query processor 106 therein, can use expression (3) above to predict a label y for a given sample x (e.g., as obtained from a subject profile of a subsequent neural query, etc.) that may or may not be a previously observed sample.

For example, historical observations may be obtained from the neural feedbacks to indicate that users with a subject profile with properties similar to those incorporated in the knowledge neuron turned on their air conditioners in the past at temperatures such as 68.1 F, 68.5 F, 68.3 F, 68.5 F, 68.6 F, etc. Based on these historical observations, the preferred temperature may be predicted as 68.25 F for a user with the properties (e.g., from the subject profile of a neural query or a neural feedback, etc.) as indicated in the knowledge neuron. The knowledge neuron may be updated accordingly, as illustrated in FIG. 3H.

3.0. Example Embodiments

Figure 4A:
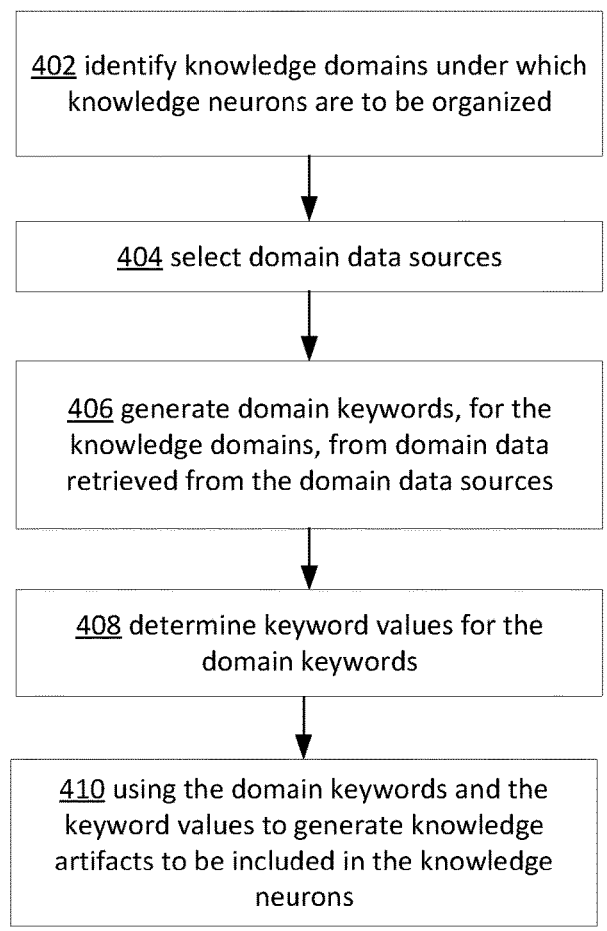
FIG. 4A through FIG. 4D illustrate example flows relating to self-learning neural knowledge artifactory for autonomous decision making.

Examples of some embodiments are represented, without limitation, in the following paragraphs:

FIG. 4A illustrates an example process flow that may be implemented by one or more computing devices such as a neural knowledge system, or one or more subsystems therein, etc., as described herein. In block 402, the system identifies one or more knowledge domains under which one or more sets of knowledge neurons are to be organized, each knowledge domain in the one or more knowledge domains corresponding to a respective set of knowledge neurons in the one or more sets of knowledge neurons (or with which knowledge neurons are to be associated).

In block 404, the system selects one or more sets of domain data sources from which domain data for generating one or more sets of knowledge artifacts for the one or more knowledge domains is to be retrieved, each set of domain data sources in the one or more sets of domain data sources corresponding to a respective knowledge domain in the one or more knowledge domains, each set of knowledge artifacts in the one or more sets of knowledge artifacts corresponding to a respective knowledge domain in the one or more knowledge domains.

In block 406, the system generates one or more sets of domain keywords, for the one or more knowledge domains, from the domain data retrieved from the one or more sets of domain data sources for generating the knowledge artifacts, each set of domain keywords in the one or more sets of domain keywords corresponding to a respective knowledge domain in the one or more knowledge domains.

In block 408, the system determines one or more sets of keyword values for the one or more sets of domain keywords, each set of keyword values in the one or more sets of keyword values corresponding to a respective set of domain keywords in the one or more sets of domain keywords.

In block 410, the system uses the one or more sets of domain keywords and the one or more sets of keyword values respectively corresponding to the one or more sets of domain keywords to generate the one or more sets of knowledge artifacts to be included in the one or more sets of knowledge neurons.

In an embodiment, the system is configured to further perform: extracting one or more sets of domain tokens from one or more sets of documents from the one or more sets of data sources; filtering the one or more sets of domain tokens to generate one or more sets of candidate domain keywords for the one or more knowledge domains, each set of candidate domain keywords corresponding to a respective knowledge domain in the one or more knowledge domains; generating the one or more sets of domain keywords based at least in part on the one or more sets of candidate domain keywords.

In an embodiment, a domain token in the one or more sets of domain tokens is filtered based on one or more token features determined for the domain token; the one or more token features determined for the domain token comprise a token feature relating to one of: frequency, structure, type, occurrence, etc., in an input text from which the domain token is extracted.

In an embodiment, the one or more sets of domain keywords comprise a domain keyword in a knowledge domain; the domain keyword in the knowledge domain is generated from a candidate domain keyword in the one or more sets of candidate domain keywords based on a similarity of the candidate domain keyword to existing domain keywords already determined for the knowledge domain.

In an embodiment, the one or more sets of domain keywords comprises a specific set of domain keywords for a specific knowledge domain in the one or more knowledge domains; the specific set of domain keywords comprises a specific domain keyword extracted from a document of a data source in a specific set of domain data sources, among the one or more sets of domain data sources, selected for the specific knowledge domain.

In an embodiment, the one or more sets of domain keywords are derived from one or more sets of documents from the one or more sets of domain data sources; the one or more sets of documents are selected based on knowledge relevance scores computed for each document in the one or more sets of documents.

In an embodiment, the one or more sets of domain data sources are specified in domain configuration data.

In an embodiment, the system is configured to further perform: using knowledge learned in the one or more sets of knowledge neurons to improve baseline performance and accuracy of a machine learning (ML) model based on one or more of: regressions, classifications, clustering, random forests, decision trees, deep learning, neural networks, probabilistic learning, another ML technique, etc.

In an embodiment, the knowledge learned in the one or more sets of knowledge neurons is used to improve accuracy of the ML model in decision making during an initial deployment of the ML model.

Figure 4B:
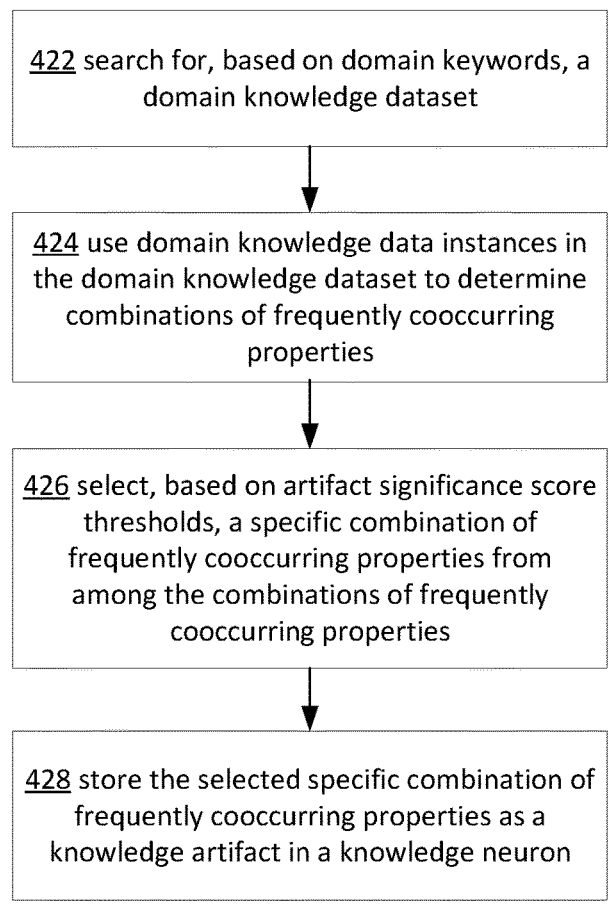

FIG. 4B illustrates an example process flow that may be implemented by one or more computing devices such as a neural knowledge system, or one or more subsystems therein, etc., as described herein. In block 422, the system searches for, based on one or more domain keywords, a domain knowledge dataset comprising a plurality of domain knowledge data instances, each domain knowledge data instance in the plurality of domain knowledge data instances comprising a plurality of property values for a plurality of properties, each property value in the plurality of property values corresponding to a respective property in the plurality of properties.

In block 424, the system uses the plurality of domain knowledge data instances in the domain knowledge dataset to determine a plurality of combinations of frequently cooccurring properties, each combination of frequently cooccurring properties in the plurality of combinations of frequently cooccurring properties representing a different combination of properties in a set of all combination of properties generating from the plurality of properties.

In block 426, the system selects, based on one or more artifact significance score thresholds, a specific combination of frequently cooccurring properties from among the plurality of combinations of frequently cooccurring properties.

In block 428, the system stores the selected specific combination of frequently cooccurring properties as a knowledge artifact in a knowledge neuron.

In an embodiment, the system is configured to further perform: computing a plurality of sets of one or more artifact significance scores for the plurality of combinations of frequently cooccurring properties, each set of one or more artifact significance scores in the plurality of sets of one or more artifact significance scores corresponding to a respective combination of frequently cooccurring properties in the plurality of combinations of frequently cooccurring properties; comparing the plurality of sets of one or more artifact significance scores with one or more artifact significance score thresholds to select the specific combination of frequently cooccurring properties from among the plurality of combinations of frequently cooccurring properties.

In an embodiment, the one or more artifact significance score thresholds relates to one or more of: a total number of properties in a combination of frequently occurring properties, support-based scores, similarity-based scores, interlink-based scores, confidence-based scores, lift-based scores, knowledge relevance scores, natural language processing generated scores, etc.

In an embodiment, the one or more domain keywords are derived from one or more existing knowledge neurons; one or more domain keywords include one or more of: one or more subject keywords or one or more inference keywords stored in the one or more existing knowledge neurons.

In an embodiment, the specific combination of frequently cooccurring properties has a total number of properties no shorter than any other combination of frequently cooccurring properties in the plurality of combinations of frequently cooccurring properties.

In an embodiment, the system is configured to further use one or more other machine learning methods to validate the specific combination of frequently cooccurring properties. The one or more other machine learning methods comprises one or more of: regression-based machine learning methods, classification-based machine learning methods, decision-tree-based machine learning methods, random-forest-based machine learning methods, etc.

In an embodiment, property values in the plurality of knowledge domain data instances for a specific property in the plurality of properties are aggregated based on a step function.

Figure 4C:
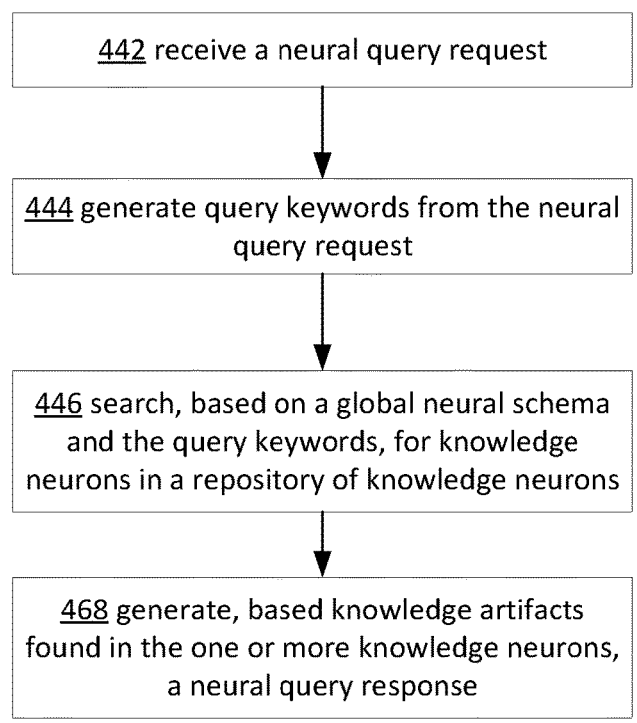

FIG. 4C illustrates an example process flow that may be implemented by one or more computing devices such as a neural knowledge system, or one or more subsystems therein, etc., as described herein. In block 442, the system receives a neural query request.

In block 444, the system generates one or more query keywords from the neural query request.

In block 446, the system searches, based at least in part on a global neural schema and the one or more query keywords generated from the neural query request, for one or more knowledge neurons in a repository of knowledge neurons.

In block 448, the system generates, based at least in part on one or more knowledge artifacts found in the one or more knowledge neurons, a neural query response to the neural query request.

In an embodiment, the neural query request includes a subject profile; the one or more query keywords comprises one or more subject keywords identified in the subject profile.

In an embodiment, the neural query request includes a predicate profile; the neural query response specifies a predicted value for a predicate property specified in the predicate profile.

In an embodiment, the global neural schema includes one or more nodes respectively representing one or more knowledge domains; the global neural schema includes one or more child nodes under the one or more nodes representing the one or more knowledge domains; each child node in the one or more child nodes specifies one or more groups of knowledge neurons in a knowledge domain represented by a parent node of each such child node.

In an embodiment, the global neural schema includes one or more first edges respectively connecting a root node to the one or more nodes; the global neural schema includes one or more second edges respectively connecting the one or more child nodes from one or more parent node of the one or more child nodes.

In an embodiment, each of the one or more first edges specifies a set of knowledge domain keywords for a respective knowledge domain in the one or more knowledge domains; each of the one or more second edges specifies one or more knowledge domain keywords related to knowledge neurons identified by a respective child node in the one or more child nodes.

In an embodiment, the neural query response specifies a predicted value for a property identified in the neural query request; the predicted value for the property is derived from combining information provided by knowledge artifacts in two or more knowledge neurons.

Figure 4D:
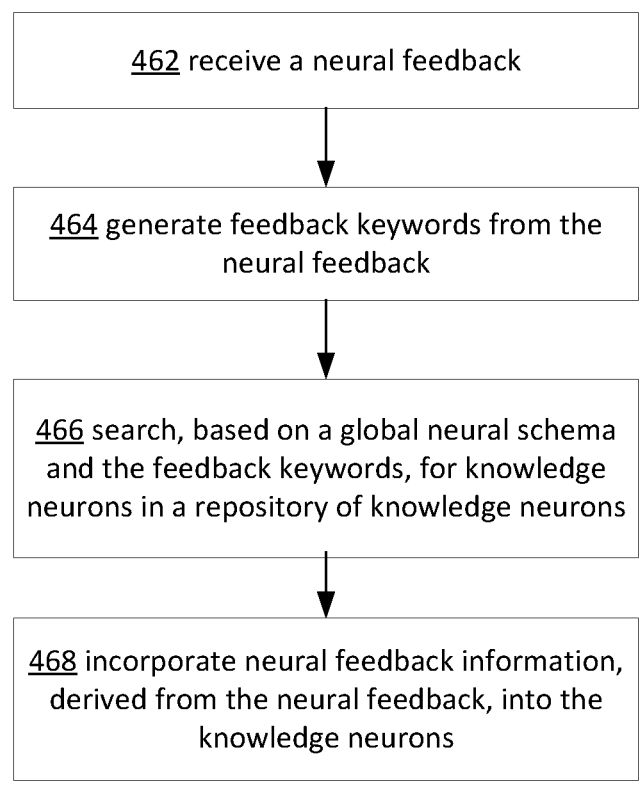

FIG. 4D illustrates an example process flow that may be implemented by one or more computing devices such as a neural knowledge system, or one or more subsystems therein, etc., as described herein. In block 462, the system receives a neural feedback.

In block 464, the system generates one or more feedback keywords from the neural feedback.

In block 466, the system searches, based at least in part on a global neural schema and the one or more feedback keywords generated from the neural feedback, for one or more knowledge neurons in a repository of knowledge neurons.

In block 468, the system incorporates neural feedback information, derived from the neural feedback, into the one or more knowledge neurons.

In an embodiment, the neural feedback information as derived from the neural feedback, is recorded one or more updated histories stored in the one or more knowledge neurons.

In an embodiment, the neural feedback information derived from the neural feedback and other neural feedback information derived from other neural feedbacks is used to predict a preferred value for a property in one or more knowledge artifacts stored in the one or more knowledge neurons.

In an embodiment, the preferred value for the property is generated using one or more other machine learning methods; the one or more other machine learning methods comprises one or more of: regression-based machine learning methods, classification-based machine learning methods, decision-tree-based machine learning methods, random-forest-based machine learning methods, etc.

In an embodiment, the preferred value for the property is generated by minimizing an objective function measuring a quality of predicted values.

In an embodiment, the neural feedback information derived from the neural feedback is used to update an existing knowledge neuron in the repository of knowledge neurons.

In an embodiment, the neural feedback information derived from the neural feedback is used to generate a new knowledge neuron to be stored in the repository of knowledge neurons.

Other examples of these and other embodiments are found throughout this disclosure.

4.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 5:
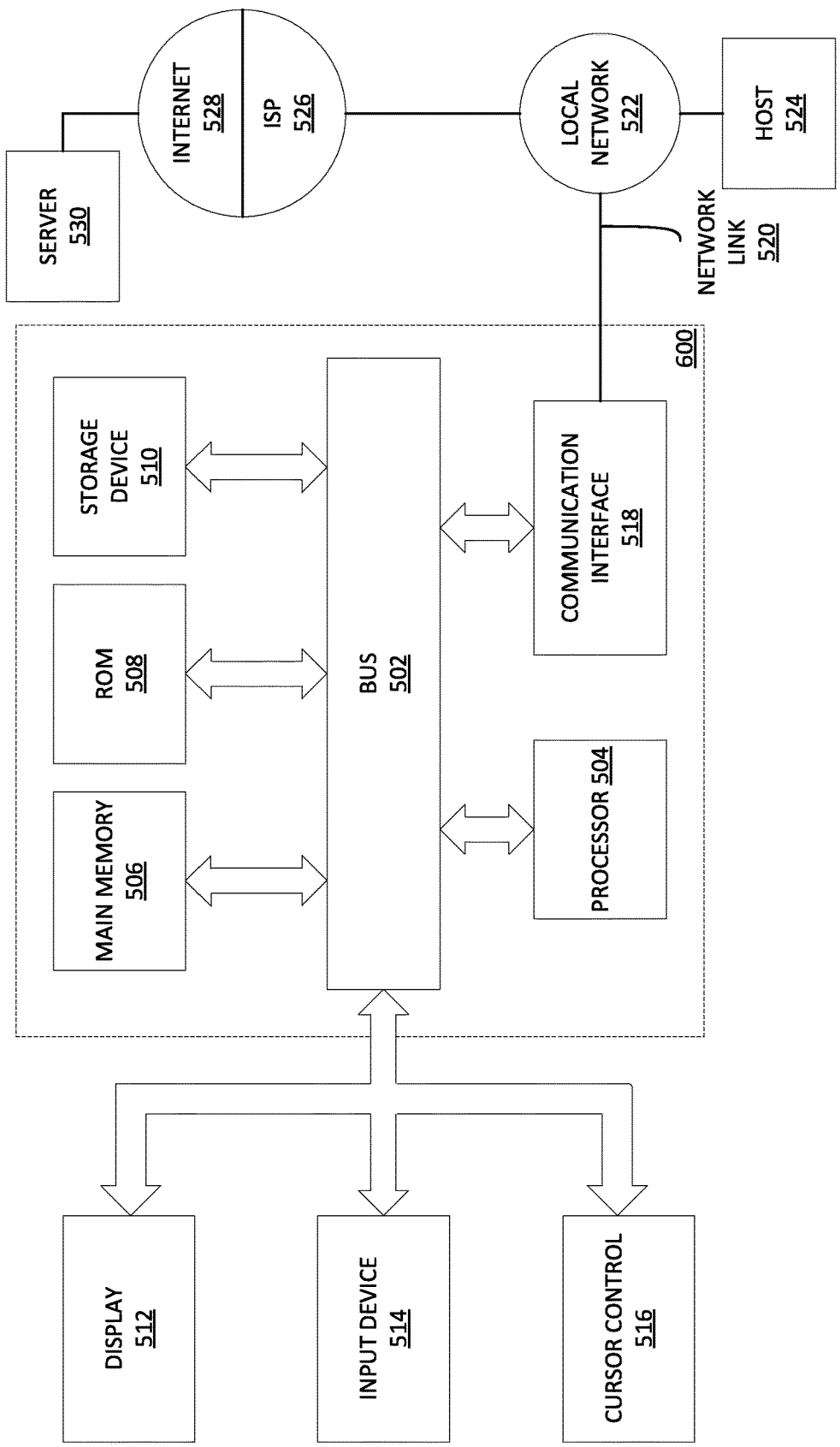
FIG. 5 is block diagram of a computer system upon which embodiments of the invention may be implemented.

FIG. 5 is a block diagram that illustrates a computer system 500 utilized in implementing the above-described techniques, according to an embodiment. Computer system 500 may be, for example, a desktop computing device, laptop computing device, tablet, smartphone, server appliance, computing main image, multimedia device, handheld device, networking apparatus, or any other suitable device.

Computer system 500 includes one or more busses 502 or other communication mechanism for communicating information, and one or more hardware processors 504 coupled with busses 502 for processing information. Hardware processors 504 may be, for example, a general purpose microprocessor. Busses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes a main memory 506, such as a random access memory (RAM) or other dynamic or volatile storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, is provided and coupled to bus 502 for storing information and instructions.

Computer system 500 may be coupled via bus 502 to one or more displays 512 for presenting information to a computer user. For instance, computer system 500 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

In an embodiment, output to display 512 may be accelerated by one or more graphics processing unit (GPUs) in computer system 500. A GPU may be, for example, a highly parallelized, multi-core floating point processing unit highly optimized to perform computing operations related to the display of graphics data, 3D data, and/or multimedia. In addition to computing image and/or video data directly for output to display 512, a GPU may also be used to render imagery or other video data off-screen, and read that data back into a program for off-screen image processing with very high performance. Various other computing tasks may be off-loaded from the processor 504 to the GPU.

One or more input devices 514 are coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

A computer system 500 may implement techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 506, from which processor 504 retrieves and executes the instructions. The instructions received by main memory 506 may optionally be stored on storage device 510 either before or after execution by processor 504.

A computer system 500 may also include, in an embodiment, one or more communication interfaces 518 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send messages and receive data, including program code and/or other types of instructions, through the network(s), network link 520, and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

In an embodiment, some or all of the systems described herein may be or comprise server computer systems, including one or more computer systems 500 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

5.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
identifying one or more knowledge domains under which one or more sets of knowledge neurons are to be organized, each knowledge domain in the one or more knowledge domains corresponding to a respective set of knowledge neurons in the one or more sets of knowledge neurons;
selecting one or more sets of domain data sources from which domain data for generating one or more sets of knowledge artifacts for the one or more knowledge domains is to be retrieved, each set of domain data sources in the one or more sets of domain data sources corresponding to a respective knowledge domain in the one or more knowledge domains, each set of knowledge artifacts in the one or more sets of knowledge artifacts corresponding to a respective knowledge domain in the one or more knowledge domains;
wherein knowledge artifacts in the one or more sets of knowledge artifacts for the one or more knowledge domains are learned from documents retrieved from a plurality of web-based data sources through machine learning with a machine learning model implemented by a computing device;
generating one or more sets of domain keywords, for the one or more knowledge domains, from the domain data retrieved from the one or more sets of domain data sources for generating the knowledge artifacts, each set of domain keywords in the one or more sets of domain keywords corresponding to a respective knowledge domain in the one or more knowledge domains;
determining one or more sets of keyword values for the one or more sets of domain keywords, each set of keyword values in the one or more sets of keyword values corresponding to a respective set of domain keywords in the one or more sets of domain keywords;
using the one or more sets of domain keywords and the one or more sets of keyword values respectively corresponding to the one or more sets of domain keywords to generate the one or more sets of knowledge artifacts to be included in the one or more sets of knowledge neurons; and
causing the one or more sets of knowledge neurons with machine learned knowledge artifacts to be used by a query processor in one or more computer devices to generate responses to query requests from client computing devices.

2. The method of claim 1, further comprising:
extracting one or more sets of domain tokens from one or more sets of documents from the one or more sets of data sources;
filtering the one or more sets of domain tokens to generate one or more sets of candidate domain keywords for the one or more knowledge domains, each set of candidate domain keywords corresponding to a respective knowledge domain in the one or more knowledge domains; and
generating the one or more sets of domain keywords based at least in part on the one or more sets of candidate domain keywords.

3. The method of claim 2, wherein a domain token in the one or more sets of domain tokens is filtered based on one or more token features determined for the domain token, wherein the one or more token features determined for the domain token comprise a token feature relating to one of: frequency, structure, type, or occurrence in an input text from which the domain token is extracted.

4. The method of claim 2, wherein the one or more sets of domain keywords comprise a domain keyword in a knowledge domain, wherein the domain keyword in the knowledge domain is generated from a candidate domain keyword in the one or more sets of candidate domain keywords based on a similarity of the candidate domain keyword to existing domain keywords already determined for the knowledge domain.

5. The method of claim 1, wherein the one or more sets of domain keywords comprises a specific set of domain keywords for a specific knowledge domain in the one or more knowledge domains, wherein the specific set of domain keywords comprises a specific domain keyword extracted from a document of a data source in a specific set of domain data sources, among the one or more sets of domain data sources, selected for the specific knowledge domain.

6. The method of claim 1, wherein the one or more sets of domain keywords are derived from one or more sets of documents from the one or more sets of domain data sources, wherein the one or more sets of documents are selected based on knowledge relevance scores computed for each document in the one or more sets of documents.

7. The method of claim 1, wherein the one or more sets of domain data sources are specified in domain configuration data.

8. The method of claim 1, further comprising: using knowledge learned in the one or more sets of knowledge neurons to improve baseline performance and accuracy of a machine learning (ML) model based on one or more of: regressions, classifications, clustering, random forests, decision trees, deep learning, neural networks, probabilistic learning, or another ML technique.

9. The method of claim 8, wherein the knowledge learned in the one or more sets of knowledge neurons is used to improve accuracy of the ML model in decision making during an initial deployment of the ML model.

10. A non-transitory computer readable medium that stores computer instructions which, when executed by one or more computing processors, cause the one or more computing processors to perform:
    identifying one or more knowledge domains under which one or more sets of knowledge neurons are to be organized, each knowledge domain in the one or more knowledge domains corresponding to a respective set of knowledge neurons in the one or more sets of knowledge neurons;
    selecting one or more sets of domain data sources from which domain data for generating one or more sets of knowledge artifacts for the one or more knowledge domains is to be retrieved, each set of domain data sources in the one or more sets of domain data sources corresponding to a respective knowledge domain in the one or more knowledge domains, each set of knowledge artifacts in the one or more sets of knowledge artifacts corresponding to a respective knowledge domain in the one or more knowledge domains;
    wherein knowledge artifacts in the one or more sets of knowledge artifacts for the one or more knowledge domains are learned from documents retrieved from a plurality of web-based data sources through machine learning with a machine learning model implemented by a computing device;
    generating one or more sets of domain keywords, for the one or more knowledge domains, from the domain data retrieved from the one or more sets of domain data sources for generating the knowledge artifacts, each set of domain keywords in the one or more sets of domain keywords corresponding to a respective knowledge domain in the one or more knowledge domains;
    determining one or more sets of keyword values for the one or more sets of domain keywords, each set of keyword values in the one or more sets of keyword values corresponding to a respective set of domain keywords in the one or more sets of domain keywords;
    using the one or more sets of domain keywords and the one or more sets of keyword values respectively corresponding to the one or more sets of domain keywords to generate the one or more sets of knowledge artifacts to be included in the one or more sets of knowledge neurons; and
    causing the one or more sets of knowledge neurons with machine learned knowledge artifacts to be used to by a query processor in one or more computer devices to generate responses to query requests from client computing devices.

11. The non-transitory computer readable medium of claim 10, wherein the computer instructions which, when executed by one or more computing processors, cause the one or more computing processors to further perform:
    extracting one or more sets of domain tokens from one or more sets of documents from the one or more sets of data sources;
    filtering the one or more sets of domain tokens to generate one or more sets of candidate domain keywords for the one or more knowledge domains, each set of candidate domain keywords corresponding to a respective knowledge domain in the one or more knowledge domains; and
    generating the one or more sets of domain keywords based at least in part on the one or more sets of candidate domain keywords.

12. The non-transitory computer readable medium of claim 11, wherein a domain token in the one or more sets of domain tokens is filtered based on one or more token features determined for the domain token, wherein the one or more token features determined for the domain token comprise a token feature relating to one of: frequency, structure, type, or occurrence in an input text from which the domain token is extracted.

13. The non-transitory computer readable medium of claim 11, wherein the one or more sets of domain keywords comprise a domain keyword in a knowledge domain, wherein the domain keyword in the knowledge domain is generated from a candidate domain keyword in the one or more sets of candidate domain keywords based on a similarity of the candidate domain keyword to existing domain keywords already determined for the knowledge domain.

14. The non-transitory computer readable medium of claim 10, wherein the one or more sets of domain keywords comprises a specific set of domain keywords for a specific knowledge domain in the one or more knowledge domains, wherein the specific set of domain keywords comprises a specific domain keyword extracted from a document of a data source in a specific set of domain data sources, among the one or more sets of domain data sources, selected for the specific knowledge domain.

15. The non-transitory computer readable medium of claim 10, wherein the one or more sets of domain keywords are derived from one or more sets of documents from the one or more sets of domain data sources, wherein the one or more sets of documents are selected based on knowledge relevance scores computed for each document in the one or more sets of documents.

16. The non-transitory computer readable medium of claim 10, wherein the one or more sets of domain data sources are specified in domain configuration data.

17. The non-transitory computer readable medium of claim 10, wherein the computer instructions which, when executed by one or more computing processors, cause the one or more computing processors to further perform: using knowledge learned in the one or more sets of knowledge neurons to improve baseline performance and accuracy of a machine learning (ML) model based on one or more of: regressions, classifications, clustering, random forests, decision trees, deep learning, neural networks, probabilistic learning, or another ML technique.

18. The non-transitory computer readable medium of claim 17, wherein the knowledge learned in the one or more sets of knowledge neurons is used to improve accuracy of the ML model in decision making during an initial deployment of the ML model.

19. An apparatus, comprising:
    one or more computing processors;
    a non-transitory computer readable medium that stores computer instructions which, when executed by the one or more computing processors, cause the one or more computing processors to perform:
- identifying one or more knowledge domains under which one or more sets of knowledge neurons are to be organized, each knowledge domain in the one or more knowledge domains corresponding to a respective set of knowledge neurons in the one or more sets of knowledge neurons;
- selecting one or more sets of domain data sources from which domain data for generating one or more sets of knowledge artifacts for the one or more knowledge domains is to be retrieved, each set of domain data sources in the one or more sets of domain data sources corresponding to a respective knowledge domain in the one or more knowledge domains, each set of knowledge artifacts in the one or more sets of knowledge artifacts corresponding to a respective knowledge domain in the one or more knowledge domains;
- wherein knowledge artifacts in the one or more sets of knowledge artifacts for the one or more knowledge domains are learned from documents retrieved from a plurality of web-based data sources through machine learning with a machine learning model implemented by a computing device;
- generating one or more sets of domain keywords, for the one or more knowledge domains, from the domain data retrieved from the one or more sets of domain data sources for generating the knowledge artifacts, each set of domain keywords in the one or more sets of domain keywords corresponding to a respective knowledge domain in the one or more knowledge domains;
- determining one or more sets of keyword values for the one or more sets of domain keywords, each set of keyword values in the one or more sets of keyword values corresponding to a respective set of domain keywords in the one or more sets of domain keywords;
- using the one or more sets of domain keywords and the one or more sets of keyword values respectively corresponding to the one or more sets of domain keywords to generate the one or more sets of knowledge artifacts to be included in the one or more sets of knowledge neurons; and
- causing the one or more sets of knowledge neurons with machine learned knowledge artifacts to be used by a query processor in one or more computer devices to generate responses to query requests from client computing devices.

20. The apparatus of claim 19, wherein the computer instructions which, when executed by one or more computing processors, cause the one or more computing processors to further perform: using knowledge learned in the one or more sets of knowledge neurons to improve baseline performance and accuracy of a machine learning (ML) model based on one or more of: regressions, classifications, clustering, random forests, decision trees, deep learning, neural networks, probabilistic learning, or another ML technique.

* * * * *